United States Patent
Yu et al.

(10) Patent No.: US 11,671,133 B2
(45) Date of Patent: Jun. 6, 2023

(54) ADAPTIVE NARROWBAND AND WIDEBAND INTERFERENCE REJECTION FOR SATELLITE NAVIGATION RECEIVER

(71) Applicant: Deere & Company, Moline, IL (US)

(72) Inventors: Wei Yu, Torrance, CA (US); Mark P. Kaplan, Culver City, CA (US); Richard G. Keegan, Palos Verdes Estates, CA (US); David M. Li, Harbor City, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/449,596

(22) Filed: Sep. 30, 2021

(65) Prior Publication Data

US 2022/0209805 A1 Jun. 30, 2022

Related U.S. Application Data

(60) Provisional application No. 63/131,065, filed on Dec. 28, 2020, provisional application No. 63/093,161, filed on Oct. 16, 2020.

(51) Int. Cl.
*H04B 1/04* (2006.01)
*H04B 1/10* (2006.01)
(Continued)

(52) U.S. Cl.
CPC ......... *H04B 1/1036* (2013.01); *H04B 1/0007* (2013.01); *H04B 1/04* (2013.01);
(Continued)

(58) Field of Classification Search
CPC ... H04B 1/04; H04B 1/10; H04B 1/12; H04B 1/1036; H04B 1/1063; H04B 1/123; H04B 1/0007; H04B 2001/0416
See application file for complete search history.

(56) References Cited

U.S. PATENT DOCUMENTS 5,121,009 A 6/1992 Braathen
5,263,053 A 11/1993 Wan et al.
(Continued)

FOREIGN PATENT DOCUMENTS

CA 2902604 A1 9/2014
CA 2893306 A1 12/2015
(Continued)

OTHER PUBLICATIONS

International Search Report and Written Opinion, re PCT Application No. PCT/US2021/072040 dated Jun. 29, 2022 (16 pages).
(Continued)

*Primary Examiner* — Thanh C Le

(57) ABSTRACT

A selective filtering module is arranged to filter or process the digital baseband signal consistent with a target receiving bandwidth, where the selective filtering module comprises a narrowband rejection filter and wide-band filter configured to reject an interference component that interferes with the received radio frequency signal. The narrowband rejection filter is configured to reject a first interference component, where the narrowband rejection filter comprises an adaptive notch filter (NF). The wide band rejection filter is configured to reject a second interference component in accordance with a pulse blanking technique. An electronic data processor is adapted to control one or more filter coefficients of narrowband rejection filter and the wide band rejection filter in accordance with one or more strategic filter control factors among ADC saturation, activation/deactivation of the notch filter, and a wide-band spectrum analysis.

9 Claims, 17 Drawing Sheets

(51) Int. Cl.
  *H04B 1/12* (2006.01)
  *H04B 1/00* (2006.01)
(52) U.S. Cl.
  CPC ..... *H04B 1/123* (2013.01); *H04B 2001/0416* (2013.01); *H04B 2001/1063* (2013.01)

(56) References Cited

U.S. PATENT DOCUMENTS

| | | |
|---|---|---|
| 5,293,402 A | 3/1994 | Crespo et al. |
| 5,309,482 A | 5/1994 | Wright et al. |
| 6,141,371 A | 10/2000 | Holmes et al. |
| 6,664,923 B1 | 12/2003 | Ford |
| 6,810,027 B1 | 10/2004 | Posti |
| 7,205,935 B2 | 4/2007 | Sleewaegen |
| 7,860,145 B2 | 12/2010 | Knight et al. |
| 8,243,772 B2 | 8/2012 | Knight et al. |
| 9,197,285 B2 | 11/2015 | Yu |
| 2002/0047799 A1 | 4/2002 | Gustafson et al. |
| 2002/0198656 A1 | 12/2002 | Ford et al. |
| 2003/0189975 A1 | 10/2003 | Fullerton |
| 2004/0087290 A1 | 5/2004 | Schmidt et al. |
| 2004/0095274 A1 | 5/2004 | Warloe et al. |
| 2004/0150557 A1 | 8/2004 | Ford et al. |
| 2004/0176034 A1 | 9/2004 | Hunter et al. |
| 2006/0012516 A1 | 1/2006 | Ford et al. |
| 2006/0040613 A1 | 2/2006 | Karabinis et al. |
| 2006/0133551 A1 | 6/2006 | Davidoff et al. |
| 2007/0058700 A1 | 3/2007 | Fenton |
| 2007/0201588 A1 | 8/2007 | Loiseau et al. |
| 2010/0118921 A1 | 5/2010 | Abdelmonem et al. |
| 2010/0195775 A1 | 8/2010 | Chamberlain |
| 2010/0246645 A1 | 9/2010 | Fenton et al. |
| 2011/0216910 A1 | 9/2011 | Lee |
| 2012/0026039 A1 | 2/2012 | Ganeshan et al. |
| 2012/0147929 A1* | 6/2012 | Malaga ............... H04B 1/0007 375/147 |
| 2014/0177682 A1 | 6/2014 | Yu |
| 2014/0327576 A1 | 11/2014 | Kumar |
| 2014/0364078 A1 | 12/2014 | Richley |
| 2015/0035701 A1 | 2/2015 | Zhang et al. |
| 2017/0180160 A1 | 6/2017 | Moorti et al. |
| 2019/0245566 A1* | 8/2019 | Luo ........................... H04L 5/14 |
| 2020/0025572 A1 | 1/2020 | Bobye |
| 2020/0220631 A1* | 7/2020 | Onggosanusi ....... H04B 17/327 |
| 2020/0295849 A1 | 9/2020 | Li |
| 2020/0334542 A1 | 10/2020 | Hoydis |
| 2021/0127284 A1* | 4/2021 | Abdelmonem ........ H04W 24/08 |
| 2022/0029774 A1* | 1/2022 | Yuan ................... H04L 25/0212 |
| 2022/0123770 A1 | 4/2022 | Yu et al. |
| 2022/0123828 A1* | 4/2022 | Yu ........................ H04B 1/7101 |
| 2022/0182088 A1* | 6/2022 | Yu ........................ H04B 1/7101 |
| 2022/0191908 A1* | 6/2022 | Back ..................... H04L 5/0053 |
| 2022/0209805 A1 | 6/2022 | Yu et al. |
| 2022/0263564 A1* | 8/2022 | Lee ......................... H04B 7/024 |
| 2022/0276389 A1* | 9/2022 | Yu ............................. G01S 19/29 |
| 2023/0024218 A1* | 1/2023 | Galeev ................. H04B 1/1027 |

FOREIGN PATENT DOCUMENTS

| | | |
|---|---|---|
| CA | 3003298 A1 | 8/2017 |
| EP | 1734377 A1 | 12/2006 |
| EP | 1990917 A1 | 11/2008 |
| EP | 2028762 A1 | 2/2009 |
| EP | 3417315 A1 | 12/2018 |
| EP | 3627190 A1 | 3/2020 |
| EP | 3742201 A1 | 11/2020 |
| ES | 2335199 T3 | 3/2010 |
| ES | 2394849 T3 | 2/2013 |
| JP | 2014204300 A | 10/2014 |
| WO | WO2005071431 A1 | 8/2005 |
| WO | WO2008135513 A1 | 11/2008 |
| WO | WO2014019331 A1 | 2/2014 |
| WO | WO2014175959 A1 | 10/2014 |
| WO | WO2017140601 A1 | 8/2017 |
| WO | WO2018019960 A1 | 2/2018 |
| WO | WO2019091769 A1 | 5/2019 |
| WO | WO2019135019 A1 | 7/2019 |
| WO | WO2022082202 A1 | 4/2022 |
| WO | WO2022082206 A1 | 4/2022 |
| WO | WO2022082211 A1 | 4/2022 |

OTHER PUBLICATIONS

S. C. Pei and C. C. Tseng, Complex Adaptive IIR Notch Filter Algorithm and Its Applications, IEEE Transactions on Circuits and Systems—II: Analog and Digital Signal Processing, vol. 41, No. 2, Feb. 1994, pp. 158-163.

Y. Liu, P.S.R. Diniz, T.I. Laakso, Adaptive Steiglitz-McBride Notch Filter Design for Radio Interference Suppression in VDSL Systems, pp. 359-363.

K. Steiglitz and L.E. McBride, A Technique for Identification of Linear Systems, IEEE Transactions on Automatic Control, vol. AC-10, No. 4, Oct. 1965, pp. 461-464.

International Search Report and Written Opinion, re PCT Application No. PCT/US2022/076187 dated Jan. 4, 2023 (16 pages).

Di Cintio Andrea et al., The GREHDA Project: GALILEO Software Receiver for High Dynamic Applications, GNSS 2007-Proceedings of the 20th International Technical Meeting of the Satellite Division of the Institute of Navigation, Sep. 28, 2007, pp. 2376-2387.

* cited by examiner

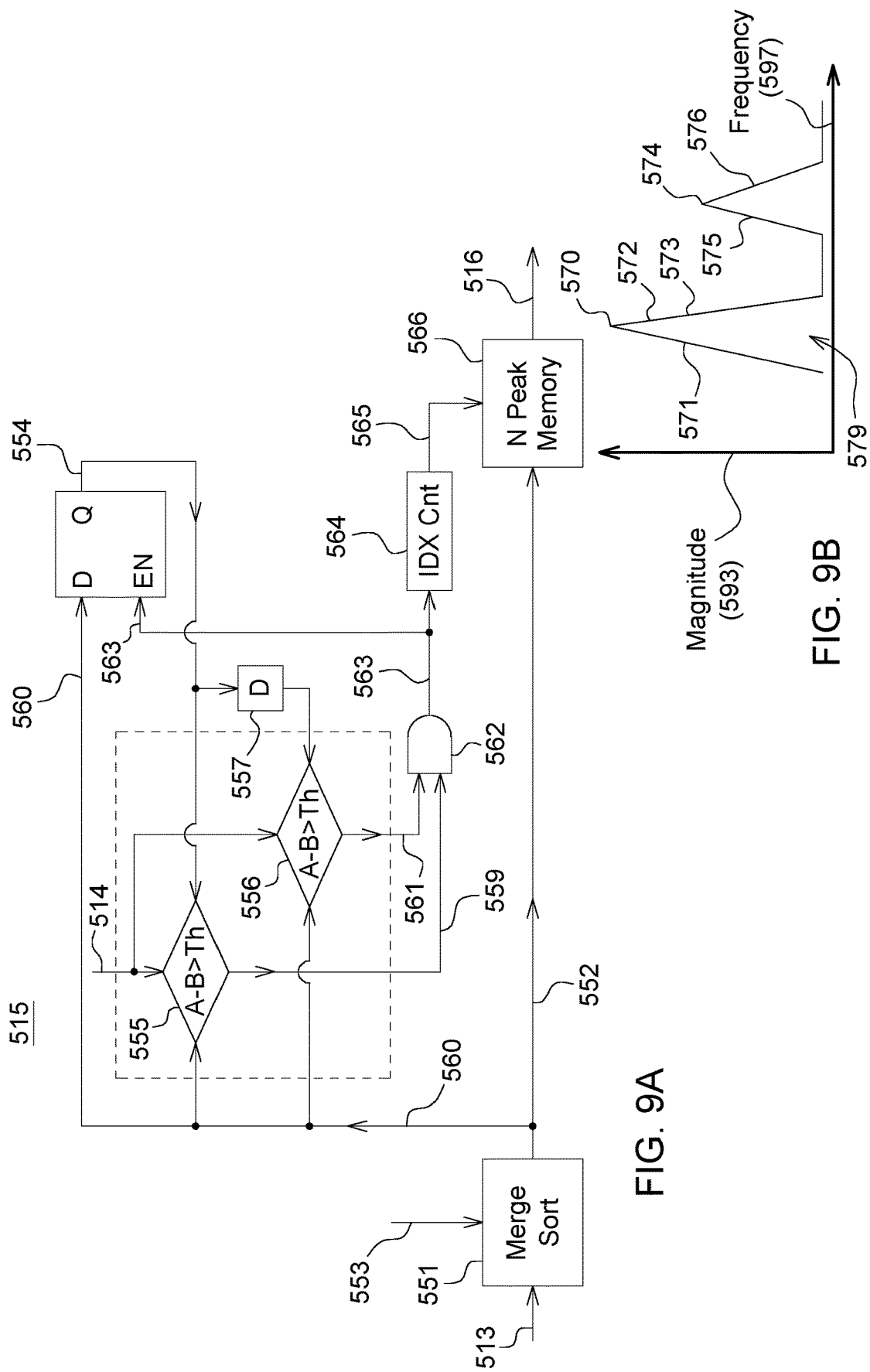

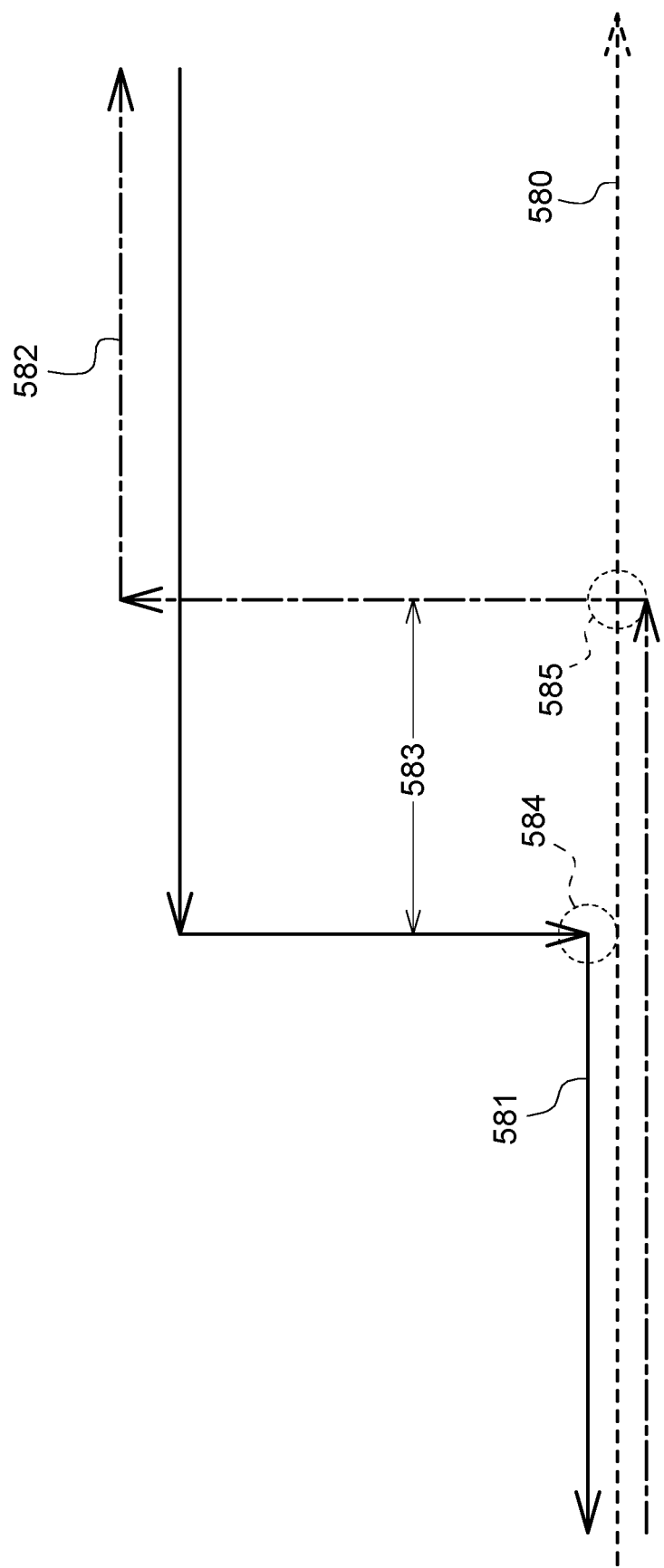

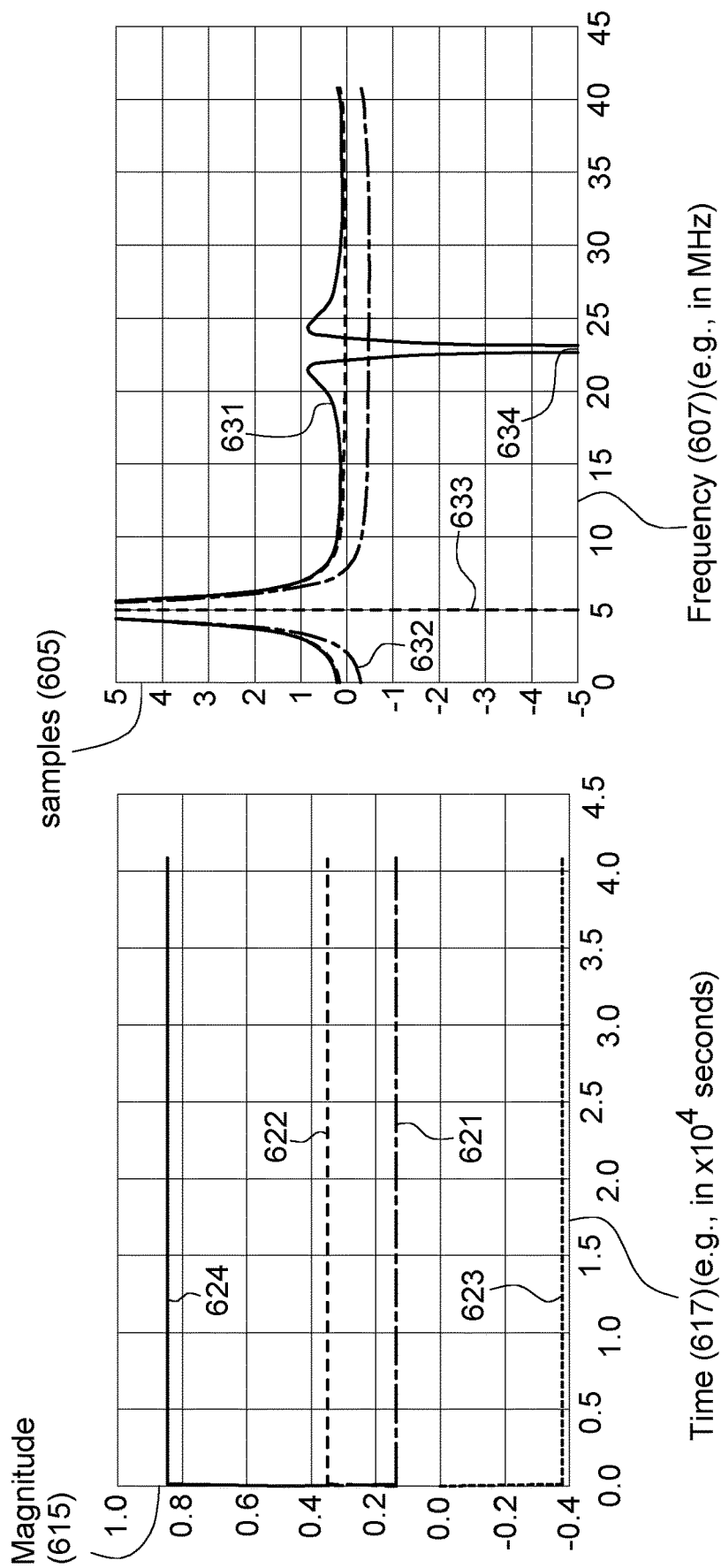

US 11,671,133 B2

ADAPTIVE NARROWBAND AND WIDEBAND INTERFERENCE REJECTION FOR SATELLITE NAVIGATION RECEIVER

RELATED APPLICATIONS

This document (including the drawings) claims priority and the benefit of the filing date based on U.S. provisional application No. 63/093,161, filed Oct. 16, 2020, and U.S. provisional application No. 63/131,065, filed Dec. 28, 2021 under 35 U.S.C. § 119 (e), where the provisional applications are hereby incorporated by reference herein.

DISCLOSURE

This disclosure relates to adaptive narrowband and wideband interference rejection for a satellite navigation receiver.

BACKGROUND

The electromagnetic spectrum is limited for wireless communications. As wireless communications are engineered to support greater data transmission throughput for end users, the potential for interference to satellite navigation receivers tend to increase. Interference may be caused by various technical factors, such as inadequate frequency spacing or spatial separation between wireless transmitters, intermodulation distortion between wireless signals, receiver desensitization, or deviation from entirely orthogonal encoding of spread-spectrum signals, outdated radio or microwave frequency propagation modeling of government regulators, among others. Accordingly, there is need to ameliorate interference through an adaptive narrowband interference rejection system.

SUMMARY

In accordance with one embodiment, a receiver system with interference rejection, the receiver system comprises an antenna for receiving a radio frequency signal. A downconverter is configured to convert the radio frequency signal to an intermediate frequency signal. An analog-to-digital converter is configured to convert the intermediate frequency signal or an analog baseband signal to a digital baseband signal. A selective filtering module is arranged to filter or process the digital baseband signal consistent with a target receiving bandwidth, where the selective filtering module comprises a narrowband rejection filter and wide-band filter configured to reject an interference component that interferes with the received radio frequency signal. The narrowband rejection filter is configured to reject a first interference component, where the narrowband rejection filter comprises an adaptive notch filter (NF) supporting an infinite impulse response (IIR) mode. The wide band rejection filter is configured to reject a second interference component in accordance with a pulse blanking technique. An electronic data processor is adapted to control one or more filter coefficients of narrowband rejection filter and the wide band rejection filter in accordance with one or more strategic filter control factors among ADC saturation, activation/deactivation of the notch filter, and a wide-band spectrum analysis.

BRIEF DESCRIPTION OF THE DRAWINGS

FIG. 9A is a block diagram of one embodiment of a wide-band spectrum analyzer that identifies a peak pattern from the magnitude versus frequency spectrum for each GNSS band.

FIG. 9B is one possible illustration of a magnitude versus frequency spectrum of a bimodal peak pattern.

FIG. 10 represents an illustration of a state diagram for a controller (e.g., electronic data processor) that controls hysteresis enable and disable of an adaptive narrowband notch filter.

FIG. 12A an illustrative graph of the magnitude for various filter coefficients of a notch filter versus time (e.g., number of sampling intervals) that relates to performance degradation of a filter resulting from a mismatch of a notch filter configuration and radio reception conditions or environment.

FIG. 12B is an illustrative graph of samples versus frequency for a filter that illustrates group delay or phase distortion versus frequency.

Like reference numbers in any set of two or more drawings indicate like features, steps, elements, steps or processes.

DETAILED DESCRIPTION

As used in this document, adapted to, arranged to or configured to means that one or more data processors, logic devices, digital electronic circuits, delay lines, or electronic devices are programmed with software instructions to be executed, or are provided with equivalent circuitry, to perform a task, calculation, estimation, communication, or other function set forth in this document.

An electronic data processor means a microcontroller, microprocessor, an arithmetic logic unit, a Boolean logic circuit, a digital signal processor (DSP), a programmable gate array, an application specific integrated circuit (ASIC), or another electronic data processor for executing software instructions, logic, code or modules that are storable in any data storage device.

As used in this document, a radio frequency signal comprises any electromagnetic signal or wireless communication signal in the millimeter frequency bands, microwave frequency bands, ultra-high-frequency bands, or other frequency bands that are used for wireless communications of data, voice, telemetry, navigation signals, and the like.

Figure 1A:
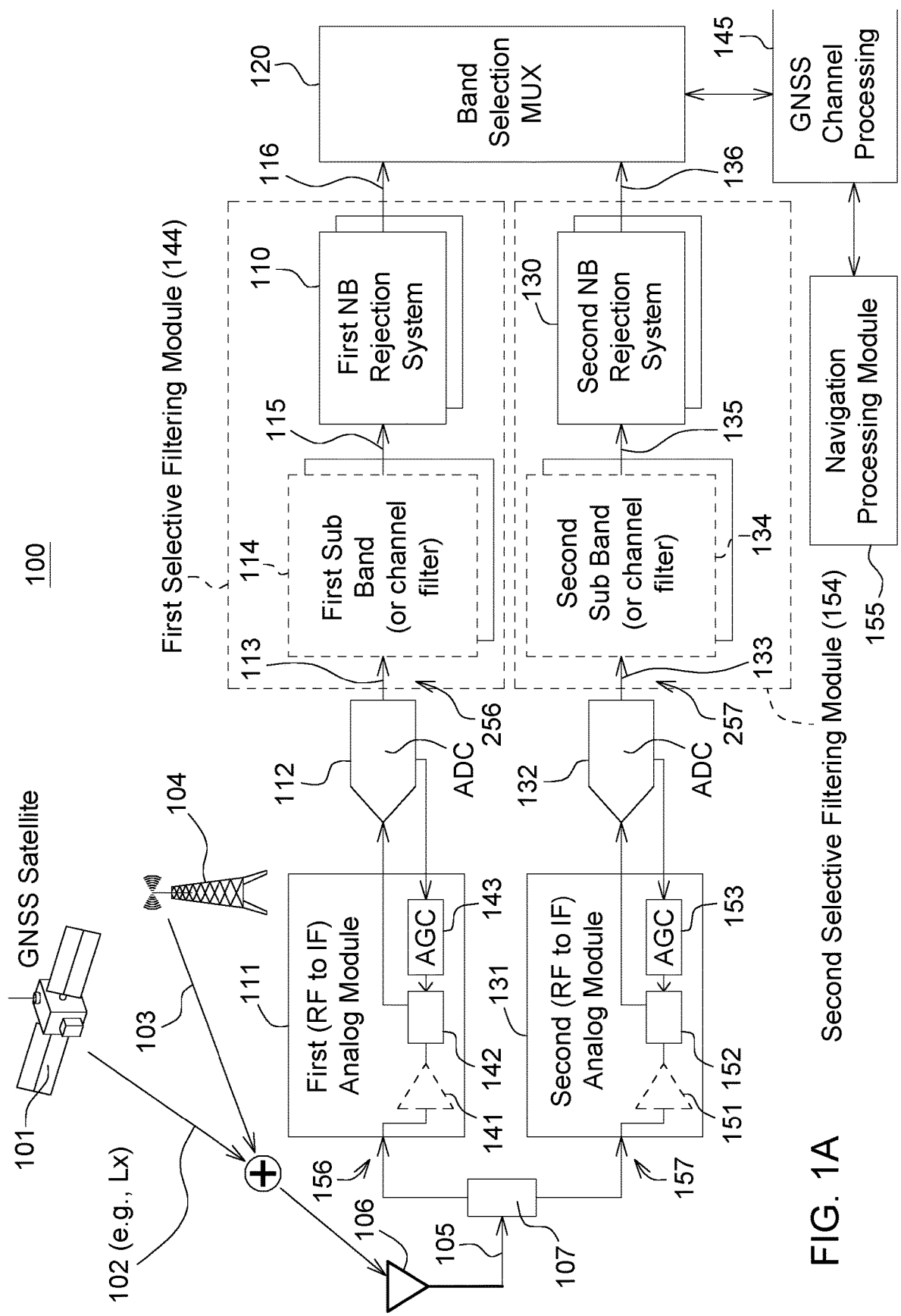
FIG. 1A is a block diagram of one embodiment of a receiver system with digital signal processing for adaptive narrowband interference rejection and wideband interference rejection for radio frequency signal, such as a microwave satellite signal.

FIG. 1A is a block diagram of a receiver system 100 with digital signal processing for adaptive narrowband interference rejection for radio frequency signal, such as a microwave satellite signal 102. A global navigation satellite system (GNSS) comprises a constellation of satellites 101 orbiting around the Earth. Each satellite 101 (e.g., GNSS satellite) comprises a transmitter for transmitting a desired navigation satellite signal 102 or radio frequency signal that can be received by a GNSS receiver system 100. Meanwhile, an interfering transmitter 104 may transmit an interference signal 103 on a frequency (or over a bandwidth) and with a modulation that has the potential to interfere with the reception of the desired navigation satellite signal 102 of the GNSS receiver.

The receiver system 100 represents an illustrative example of one possible reception environment for a radio receiver such as a global navigation satellite system (GNSS) receiver. The satellite 101 (e.g., satellite vehicle) transmits the satellite signal 102 on multiple frequencies, such that the collective set of signals may be referred to as a composite signal. For example, in FIG. 1A the Lx can represent L1, L2, L5 signals that are used in a Global Positioning System (GPS). The satellite signal 102 will be attenuated or disturbed by free space propagation, the ionosphere, and troposphere. In practice, the satellite signal 102 can be impacted by background noise and/or some potential interference signals 103 (e.g., narrowband interference signal). For example, at a terrestrial radio tower, an interfering transmitter 104 (e.g., that uses Fifth Generation (5G) Wireless technology with claims of up to 20 Gigabits per second (20 Gbps) data transmission rates and commensurately wide bandwidths) may transmit one or more interference signals 103 within the same or adjacent band to one or more transmitted satellite signals 102 from the satellite 101. The interference signal 103 may comprise wideband interference (WBI, e.g., a pulse-like signal) or narrowband interference (NBI, e.g., a continuous wave (CW) signal, which bandwidth is relatively narrower than the GNSS signal), or both WBI and NBI components. The scope of this disclosure will concentrate on reduction or filtering of interference from one or more narrowband interference signals, alone or in combination with a wideband interference signal. As used herein, the NBI may be synonymous with an NBI component or NBI components.

FIG. 1A shows a receiver system 100 (e.g., satellite navigation receiver) capable of receiving signals transmitted by satellites 101 that include one or more carrier signals (e.g., a first carrier (L1), a second carrier (L2) and an additional third carrier (L5) of the Global Positioning System (GPS)) such that the receiver system 100 can determine position, velocity, and attitude (e.g., yaw, tilt and roll angles) with very high accuracy and precision based on the received signals. The received signals may be transmitted from one or more satellites 101, such as a GPS satellite, a Galileo-compatible satellite, or a Global Navigation Satellite System (GLONASS) satellite. The satellites 101 have approximately known orbital positions versus time that can be used to estimate the relative position between an antenna 106 of the receiver system 100 (e.g., satellite navigation receiver) and each satellite 101, based on the propagation time of one or more received signals between four or more of the satellites 101 and the antenna 106 of the receiver 100.

Precise point positioning (PPP) includes the use of precise satellite orbit and clock corrections provided wirelessly via correction data, rather than through normal satellite broadcast information (ephemeris and clock data) that is encoded on the received satellite signals, to determine a relative position or absolute position of a mobile receiver. PPP may use correction data that is applicable to a wide geographic area. Although the resulting positions can be accurate within a few centimeters using state-of-the-art algorithms, conventional precise point positioning can have a long convergence time of up to tens of minutes to stabilize and determine the float or integer ambiguity values necessary to achieve the purported (e.g., advertised) steady-state accuracy. Hence, such long convergence time is typically a limiting factor in the applicability of PPP.

In accordance with one embodiment, FIG. 1A illustrates a receiver system 100 with a dual-path receiver configuration. In a dual-path receiver configuration with interference rejection, the receiver system 100 comprises an antenna 106 for receiving a radio frequency signal, such as a microwave frequency satellite signal (e.g., one or more satellite carrier signals from multiple satellites, such as at least four orbiting satellites). The antenna 106 is coupled to a signal splitter 107 that splits the received radio frequency signal into a first radio frequency signal and a second radio frequency signal, where the first radio frequency signal and the second radio frequency signal are generally identical to each other. Further, the first radio frequency signal and the second radio frequency signal are essentially an attenuated version of the received radio frequency signal at an output port 105 of the antenna 106. The splitter 107 may comprise a diplexer, a hybrid splitter 107, a radio frequency transformer, or the like.

Here, a dual band system is described as an example, although in other configurations multiple parallel signal paths for corresponding different frequency bands may be used. For example, a dual band system includes a low-band and a high band, where the low-band has a lower frequency range than the high band does. For the Global Positioning System (GPS), the transmitted L1 frequency signal of a satellite 101 may comprise the high band; the transmitted L2 frequency signal may comprise the low band signal. Further, the L1 carrier is at 1,575.42 MHz, which is modulated with the P(Y) code (pseudo random noise code) and M code that occupies a target reception bandwidth on each side of the carrier. Meanwhile, the L2 carrier is at 1,227.6 MHz and modulated with the C/A (coarse acquisition) code, P(Y) code (pseudo random noise code) and M code that occupies a target reception bandwidth on each side of the carrier. The splitter 107 (e.g., diplexer) splits the composite signal into the first signal path (e.g., upper signal path or high-band path) and the second signal path (e.g., lower path or low-band path).

In one embodiment, the signal splitter 107 or hybrid may split the received signal into two received radio frequency signals for processing by a first analog module 111 and a second analog module 131. The first analog module 111 may comprise an optional pre-amplifier 141 or a low-noise amplifier (LNA) for amplifying the received signal. Similarly, the second analog module 131 may comprise an optional pre-amplifier 151 or a low-noise amplifier (LNA) for amplifying the received signal. To simplify the receiver analog filtering design, the front-end of a typical modern GNSS receiver uses a wideband front-end design to receive multiple GNSS signals using two/three wideband filters (not shown), where each band targets a target bandwidth (e.g., 140-300 MHz).

In the first signal path, a first downconverter 142 is configured to convert the (amplified) first radio frequency signal to an intermediate frequency signal. For example, the first analog module 111 comprises a first downconverter 142, such as the combination of a mixer and a local oscillator, which moves the high band (L1, G1, B1, or similar frequency associated with a GNSS) radio frequency (RF) into the intermediate frequency (IF). The first downconverter 142 is coupled to the first analog-to-digital (ADC) converter 112.

In the first signal path, a first automatic gain control (AGC) 143 is coupled to the first ADC 112 and the first downconverter 142. For example, in one configuration of the first signal path, a first automatic gain control (AGC) 143 is coupled to the first ADC 112, the first downconverter 142, and the first pre-amplifier 141. The first automatic gain control (AGC) 143 may control the gain (e.g., root mean square (RMS) amplitude) of an input signal to the corresponding first analog-to-digital converter (ADC) 112 to be constant or within a target range (e.g., despite fluctuations in ambient radio frequency noise and the interference signal 103). The first AGC 143 receives gain-related feedback from the first ADC 112 to adjust the gain setting of first downconverter 142 (and/or the first pre-amplifier 141).

In the second signal path, a second downconverter 152 is configured to convert the (amplified) second radio frequency signal to an intermediate frequency signal. For example, the second analog module 131 comprises a second downconverter 152, such as the combination of a mixer and a local oscillator, which moves the low band (L2, or similar frequency associated with a GNSS) radio frequency (RF) into the intermediate frequency (IF).

In the second signal path, a second automatic gain control (AGC) 153 is coupled to the second ADC 132 and the second downconverter 152. For example, in one configuration of the second signal path, a second automatic gain control (AGC) 153 is coupled to the second ADC 132, the second downconverter 152, and the second pre-amplifier 151. The second automatic gain control (AGC) 153 may control the gain (e.g., root mean square (RMS) amplitude) of an input signal to the corresponding second analog-to-digital converter (ADC) 132 to be constant or within a target range (e.g., despite fluctuations in ambient radio frequency noise and the interference signal 103). The second AGC 153 receives gain-related feedback from the second ADC 132 to adjust the gain setting of second downconverter 152 (and/or the second pre-amplifier 151).

Each analog-to-digital converter (ADC) (112, 132) may be coupled to its corresponding automatic gain control (AGC) (143, 153) that provides variable gain amplification. In turn, each AGC is coupled to its corresponding downconverter (142, 152). In one embodiment, the automatic gain control AGC provides a feedback signal to the downconverter (142, 152) or intermediate frequency (IF) filter (e.g., analog IF filter) that is associated with the downconverter. The downconverter (142, 152) or its analog IF filter adapts the signal voltage (pea-to-peak) within the ADC 112 to be commensurate with its operational range.

In one embodiment, each ADC (112, 132) samples the analog received signal (from the corresponding downconverter (142, 152)) using a predefined sampling rate, which, per Nyquist theorem, should be equal to or greater than two times the bandwidth (e.g., target reception bandwidth) for the practical sampling design. The bandwidth of the ADC determines maximum tolerable interference at a given quantization loss. The resulting digital sequence, filter input or baseband signal (113, 133) reconstructs the received signal, such as the first signal (e.g., high-band RF signal) and the second signal (e.g., low-band RF signal) to the baseband signal with a corresponding baseband bandwidth or range.

In terms of the AGC feedback control from its respective ADC (112, 132), the AGC feedback control can be done either in analog or digital domain. For example, an envelope detector is typically used for AGC and variable gain control if analog control is used. Because of advances in digital processing theory and practice, the digital processing for the AGC feedback control, can be based on a statistical processes, such as digital analysis of a histogram of the sample digital stream (or baseband signals 113, 133; e.g., filter inputs) at the output of the corresponding analog-to-digital converter (ADC;112, 132) to generate a feedback signal to control the AGC (143, 153), such as the first AGC 143 associated with the corresponding first signal path and the second AGC 153 associated with the second signal path. Each AGC is coupled to the downconverter (142, 152), which in practice may comprise the downconverter and IF filter module with inherent gain/amplification adjustments.

A first analog-to-digital converter 112 is configured to convert the intermediate frequency signal or an analog baseband signal to a digital baseband signal. A first selective filtering module 144 is arranged to filter or process the digital baseband signal, where the first selective filtering module 144 may comprise a first sub-band filter 114 (e.g., first bandpass filter) and first narrowband rejection system 110 (e.g., first narrowband rejection filter, alone or together with bandpass filter) configured to reject an interference component that interferes with the received radio frequency signal.

In one embodiment, the selective filtering module (144, 154) comprises an adaptive notch filter that supports an infinite impulse response (IIR). Within the selective filtering module (144, 154), an electronic controller or electronic data processor is configured to control the adaptive notch filter and to execute a search technique (e.g., artificial intelligence (AI) search technique) to converge on filter coefficients and to recursively adjust the filter coefficients of the adaptive notch filter in real time to adaptively adjust one or more filter characteristics (e.g., maximum notch depth or attenuation, bandwidth of notch, or general magnitude versus frequency response of notch).

The first selective filtering module 144 comprises a first narrowband rejection system 110, such as an adaptive notch filter that supports an infinite impulse response (IIR). A controller is configured to control the first adaptive notch filter and to execute a search technique (e.g., artificial intelligence (AI) search technique) to converge on first filter coefficients and to recursively adjust the first filter coefficients of the first adaptive notch filter in real time to adaptively adjust one or more filter characteristics (e.g., maximum notch depth or attenuation, bandwidth of notch, or general magnitude versus frequency response of notch).

In the second signal path, a second analog-to-digital converter 132 is configured to convert the intermediate frequency signal or an analog baseband signal to a digital baseband signal. A second selective filtering module 154 is arranged to filter or process the digital baseband signal, where the second selective filtering module 154 may comprise a second sub-band filter 134 (e.g., second bandpass filter) and second narrowband rejection system 130 (e.g., second narrowband rejection filter) configured to reject an interference component that interferes with the received radio frequency signal.

The second selective filtering module 154 comprises a second narrowband rejection system 130, such as an adaptive notch filter that supports an infinite impulse response (IIR). In the second selective filtering module 154, an electronic controller or electronic data processor is configured to control the second adaptive notch filter and to execute a search technique (e.g., artificial intelligence (AI) search technique) to converge on second filter coefficients and to recursively adjust the second filter coefficients of the second adaptive notch filter in real time to adaptively adjust one or more filter characteristics (e.g., maximum notch depth or attenuation, bandwidth of notch, or general magnitude versus frequency response of notch).

A selective filtering module, such as a first selective filtering module 144 or a second selective filtering module 154, is arranged to filter or process the digital baseband signal, where the filtering module may comprise one or more of the following: (a) a first sub-band filter 114 or first channel filter, such as a pass-band filter to filter signals outside a target reception bandwidth; (b) a first narrowband rejection system 110, such as a narrowband rejection filter configured to reject an interference component at a target rejection frequency or within a target rejection bandwidth that interferes with the received radio frequency signal; (c) a second sub-band filter 134 or second channel filter, such as a pass-band filter to filter signals outside a target reception bandwidth; (d) a second narrowband rejection system 130, such as a narrowband rejection filter configured to reject an interference component at a target rejection frequency or within a target rejection bandwidth that interferes with the received radio frequency signal. For example, within each selective filtering module (144, 154) or each sub-band filter (114, 134), such as a bandpass filter (BPF) attenuates or rejects the image band of the mixer output of the downconverter (142, 152), or frequencies outside of the target reception bandwidth of the received signal about its central carrier.

The first selective filtering module 144 comprises a first sub-band filter 114 (e.g., digital GNSS band filter) that extracts the targeted component or digital signal from the first signal (e.g., high-band signal or whole high band spectrum) at a first node that corresponds to baseband signal (e.g., filter input 113). At the output terminal of the first sub-band filter 114, the signal 115 or the first resultant signal comprises a GNSS signal at a band of interest (e.g. L1 or G1 or B1), the narrowband interference NBI, and the noise; the wide-band interference (WBI). Similarly, the second selective filtering module 154 comprises a second sub-band filter 134 (e.g., digital GNSS band filter) that extracts the targeted component or digital signal from the second signal (e.g., low-band signal or whole low band spectrum) at a second node that corresponds to filter input for baseband signal 133. At the output terminal of the second sub-band filter 134, the signal 135 or the second resultant signal comprises a GNSS signal at a band of interest (e.g. L2 or G2 or B2), the narrowband interference NBI, and the noise; the WBI. The WBI mitigation is not addressed directly in this disclosure, although certain filtering techniques may have general applicability to both NBI and WBI.

In one example, a relatively strong NBI component in the received satellite signal 102 (e.g., received signal or received composite signal) will lead to signal-to-noise ratio (SNR) degradation. In practice, such SNR degradation is significantly determined by the relative location of NBI reference to the pseudorandom noise (PN) modulated radio frequency signal in the frequency domain and the de-spreading gain that a specific PN sequence provides. The quantity analysis of such impact on SNR degradation or receiver performance will be discussed later in this disclosure.

To mitigate the impact of the NBI on the PN sequence demodulation performance, the first narrowband rejection system 110 adaptively reject the NBI. As shown in FIG. 1A, the first narrowband rejection system 110 is coupled to a signal 115 of the first filter output of the first sub-band filter 114. The first narrowband rejection system 110 filters the first signal to reject NBI in the first signal.

Similarly, the second narrowband rejection system 130 (e.g., narrowband filter, alone or together with a bandpass filter) filters the second signal to reject NBI in the second signal. As shown in FIG. 1A, the second narrowband rejection system 130 is coupled to the second filter output, which is associated with signal 135, of the second sub-band filter 134. The second narrowband rejection system 130 filters the second signal to reject NBI in the second signal.

At the output of each narrowband rejection system (110, 130) the residual signal (e.g., inputted to the band selection multiplexer 120), ideally, contains only the PN signal and the noise because the NBI would be completely eliminated. In practice, the NBI will be attenuated, reduced or ameliorated in the PN signal based on the performance of the embodiments of the adaptive filtering algorithms described in this disclosure.

As shown in FIG. 1A, the first selective filtering module 144 comprises one or more of the following associated with a first digital signal path 256: (a) a first sub-band filter 114, such as a first channel filter or a first bandpass filter for filtering a first target reception bandwidth (e.g., GNSS sub-band for L1 or L2 signal), and (b) a first narrowband rejection system 110, such as first adaptive narrowband interference rejection filter. The second selective filtering module 154 comprises one or more of the following associated with a second digital signal path 257: (a) a second sub-band filter 134, such as a second channel filter or a second bandpass filter for filtering a second target reception bandwidth (e.g., GNSS sub-band for L1 or L2 signal), and (b) a second narrowband rejection system 130, such as a second adaptive narrowband interference rejection filter.

Along the first analog signal path 156 (e.g., the upper signal path), the first analog signal from spitter 107 (e.g., coupler) is processed by the first downconverter 142, which comprises an IF filter (e.g., analog IF filter). The first downconverter 142 is coupled to the corresponding first ADC 112. The first AGC 143 is coupled between the first ADC 112 and the first downconverter 142 for adjusting the gain or scaling the input signal to the first ADC 112. At the output of the first ADC 112, the first resultant digital stream or digital baseband signal 113 (e.g., filter input) represents the low-band RF signal at baseband range. The first sub-band filter 114 (e.g., dynamically configurable bandpass selective filtering) extracts the signal from a targeted band (e.g. L1). The first NBI rejection system 110 is added to mitigate the PN demodulation degradation on the targeted band. This disclosure describes illustrative or possible designs (and respective estimated or modeled performance) for a WBI filtering, alone and together with, the first narrowband rejection system 110 and the second narrowband rejection system 130.

Equivalently, to its counterpart along the first analog signal path 156 (e.g., the upper signal path), the second analog signal path 157 (e.g. the lower signal path) from splitter 107 (e.g., coupler) is processed by the second down converter 152, which comprises an IF filter (e.g., analog IF filter). The second downconverter 152 is coupled to the second ADC 132. The second AGC 153 is coupled between the second ADC 132 and the second downconverter 152 for adjusting the gain or scaling the input signal to the second ADC 132. At the output of the second ADC 132, the second resultant digital stream or digital baseband signal 133 represents the low-band RF signal at baseband range. The bandpass selective filtering 134 extracts the signal from a targeted band (e.g. L2, L5 etc.). The second NBI rejection system 130 is added to mitigate the PN demodulation degradation on the targeted band. This disclosure describes illustrative or possible designs (and respective estimated or modeled performance) to the first narrowband rejection system 110 and the second narrowband rejection system 130.

A band-selection multiplexor (MUX) 120 is coupled to the output of the first narrowband rejection system 110 (e.g., first adaptive narrowband rejection filter) and the second narrowband rejection system 130 (e.g., the second adaptive narrowband rejection filter) to select the digital sample stream or channel that represents the first signal (e.g., first target GNSS signal) or the second signal (e.g., second target GNSS signal), where each signal may be modulated with or encoded with target PN sequence or another encoding scheme. For example, the band-selection multiplexer selects the first signal, the first channel or L1 band if the targeted PN sequence type is GPS L1 carrier (CA).

In one embodiment, one or more appropriate sample streams will be further processed by the GNSS channel processing module 145, which typically comprises: one or multiple carrier phase demodulators, a replica or local PN code generator sampled at multiple delayed phases, banks of correlators, and multiple accumulators, to create a bank of in-phase (I) and quadrature (Q) measurements at an interval of millisecond (ms) or multiple milliseconds to drive the baseband tracking loop.

Further, in some embodiments the GNSS channel processing module 145 may further comprise a binary offset sub-carrier (BOC) modulator (used for modern GNSS signal such as GPS L1C, BeiDou B1C, Galileo E1 signals etc.).

In one embodiment, the GNSS channel processing module 145 may comprise a baseband tracking loop module for tracking of code phase and carrier phase. For example, the baseband tracking loop module derives correction or control signals to control a local oscillator or the numerically controlled oscillators (NCOs) in the GNSS signal processing module to maintain the synchronization between the received signal in the channel and the local replica of that channel with respect to code phase and carrier phase.

As illustrated in FIG. 1A, a GNSS channel processing module 145 is coupled to a navigation processing module 155. In one embodiment, the navigation processing module 155 takes a pseudo-range measurements and carrier phase measurements and other related information from the satellites 101 to generate the position solution, which is used as a feedback to align the receiver crystal-grade clock (e.g., of lower temporal precision) with the satellite-based atomic grade clock (e.g., of higher temporal precision); the solution also, combined with other information, generates the in-view satellites 101 list to control the appropriate receiver resource allocation. The position solution may define one or more of the following: a two-dimensional or three-dimensional position of the receiver, which may be expressed in geographic coordinates; attitude, such as roll, pitch, and yaw angular data; and motion data that represents velocity, and or acceleration data related to position and attitude data.

The interference signal 103 may comprise a wideband interference component (WBI, e.g., pulse like signal), a narrowband interference component (NBI), or both. Typically, WBI arises from a pulsed interference signal or pulse-like interference signal, whereas the NBI arises from a continuous wave (CW) interference. The NBI has a bandwidth that is relatively narrower to the GNSS signal, as opposed to the WBI. For example, the WBI may have a greater bandwidth than the GNSS signals or satellite signals 102, such as the L1, L2 or L5 signal (e.g., individually or collectively Lx signals) of the Global Positioning System.

In one embodiment, the first (RF to IF) analog module 111 comprises a first bandpass filter (BPF) that rejects the image band of the mixer output of the downconverter 142 associated with the first analog module 111. For example, the first analog module 111 may comprise a high band RF to IF analog chain that comprises a filter and a variable gain amplifier (e.g., automatic gain control 143). In an alternate embodiment, within the first analog module 111, a single stage or multiple stages of intermediate frequency IF filtering can be used.

Similarly, the second (RF to IF) analog module 131 comprises a second bandpass filter (BPF) that rejects the image band of the mixer output of the downconverter 152 associated with the second analog module 131. For instance, the second analog module 131 may comprise a low band RF to IF analog chain the comprises a filter and variable gain amplifier (e.g., automatic gain control 153). In an alternate embodiment, within the second analog module, a single stage or multiple stages of intermediate frequency IF filtering can be used.

An automatic gain control (AGC) (143, 153) comprises a variable gain amplifier (VGA) that is adapted to adjust the signal voltage (peak-to-peak signal voltage) within a required operational range of the corresponding ADC (112, 132) to minimize: (a) distortion of the digital baseband signal (or sampled analog signal input) into the ADC (112, 132), or (b) clipping of the digital baseband signal (or sampled analog signal input) into to the ADC (112, 132), or both.

Each ADC (112, 132) samples the analog signal using a predefined sampling rate, such as a sampling rate in accordance with the Nyquist theorem. According to common interpretations of the Nyquist theorem, the sampling rate should be greater than the bandwidth of the sampled analog input signal to the ADC (112, 132) for complex sampling (e.g., of real and imaginary modeled signal components) and twice the bandwidth of the sampled analog input signal to the ADC (112, 132) for the real sampling design. The bandwidth of the ADC can determine or impact a maximum tolerable interference at a given quantization loss, although particular designs of ADCs can vary.

The ADC (112, 132) outputs a resulting digital sequence or digital baseband signal 113, which represents the RF spectrum of received signal in the baseband range. In the first digital front end of the receiver, the first selective filtering module 144 comprises a first sub-band filter 114 (e.g., digital bandpass filter) that does one or more of the following: (a) filters the out-of-band component of the digital baseband signal 113; (b) monitors the dynamic change (e.g., of the frequency versus magnitude response) of the input baseband signal 113 based on an observed histogram of the input baseband signal 113 (e.g., during interference periods); (c) generates feedback, alone or together with the ADC, to control VGA or AGC 143 in first analog module 111; and (d) detects the WBI in the baseband signal based on evaluation of the input baseband signal 113 (e.g., dynamic changes in histogram) and enables the blanking functionality to reject WBI in steady-state operational mode. In one configuration, the dynamic change in the input baseband signal can be referenced to a generally interference-free period of reception of a reference input baseband signal in calibration settings or factory settings of the GNSS receiver.

In one embodiment, the digital GNSS band filtering of the first sub-band filter 114 extracts the targeted component from the whole received signal spectrum represented by the corresponding baseband digital signal 113. The resultant signal outputted by the first sub-band filter may comprises the following signal components: (1) a GNSS signal at a band of interest (e.g. L1 or G1 or B1), (3) the NBI, (4) the WBI (e.g., to the extent not blanked, attenuated, rejected or filtered out by the first sub-band filter 114) and (5) the noise component (e.g., background noise floor and receiver noise).

The ADC (112, 132) outputs a resulting digital sequence or digital baseband signal 133, which represents the RF spectrum of received signal in the baseband range. In the second digital front end of the receiver, the second selective filtering module 154 comprises a second sub-band filter 134 (e.g., digital bandpass filter) that does one or more of the following: (a) filters the out-of-band component of the digital baseband signal 133; (b) monitors the dynamic change (e.g., of the frequency versus magnitude response) of the input baseband signal 133 based on an observed histogram of the input baseband signal 133 (e.g., during interference periods); (c) generates feedback, alone or together with the ADC, to control VGA or AGC 153 in first analog module 111; and (d) detects the WBI in the baseband signal based on evaluation of the input baseband signal 133 (e.g., dynamic changes in histogram) and enables the blanking functionality to reject WBI in steady-state operational mode. In one configuration, the dynamic change in the input baseband signal can be referenced to a generally interference-free period of reception of a reference input baseband signal in calibration settings or factory settings of the GNSS receiver.

In one embodiment, the digital GNSS band filtering of the second sub-band filter 134 extracts the targeted component from the whole received signal spectrum represented by the corresponding baseband digital signal 133. The resultant signal outputted by the second sub-band filter 134 comprises the following signal components: (1) a GNSS signal at a band of interest (e.g., L2 or G2 or B2), (3) the NBI, (4) the WBI, and (5) the noise component (e.g., background noise floor and receiver noise).

If there is a relatively strong NBI component in the received signal that exceeds an absolute signal strength threshold or a relative signal strength threshold with respect to the desired or target received signal, the NBI will lead to signal-to-noise ratio (SNR) degradation. The SNR degradation can depend on factors, such as the relative location of NBI reference to the received signal, and the encoding or modulation of the received signal, such as spread-spectrum modulation with a pseudorandom noise (PN) like signal in the frequency domain and the dispreading gain that a specific PN sequence provides. To mitigate the impact of the NBI on the PN sequence demodulation performance, the first NB rejection system 110 is used to adaptively reject the NBI and the second NB rejection system 130 is used to adaptively reject the NBI. The residual signal at the output of the NB rejection system (110, 130), ideally, only comprises the PN signal and the noise.

Meanwhile, the first sub-band filter 114 applies WBI blanking; the second sub-band filter 134 applies WBI blanking to address or attenuate WBI. In the first sub-band filter 114, the WBI blanking technique can introduce, or tends to introduce, a phase jump which, in turn, can result in an error signal with high frequency component to drive the adaptive feedback update of the NBI rejection system 110. Therefore, within the first selective filtering module 144, a compensator compensates for the potential phase jump to preserve the full performance of the first NB rejection system 110; avoid transient or permanent divergence of the first NB rejection system 110 (e.g., NB rejection module).

In the second sub-band filter 134, the WBI blanking technique can introduce, or tends to introduce, a phase jump which, in turn, can result in an error signal with high frequency component to drive the adaptive feedback update of the second NBI rejection system 130. Therefore, within the second selective filtering module 154, a compensator compensates for the potential phase jump to preserve the full performance of the second NB rejection system 130; avoid transient or permanent divergence of the second NB module 130. A strategic method is introduced in this disclosure to improve the stability concerns and speed up the resettlement process.

In one embodiment, the first sub-band filter 114 or digital front end: filters the out-of-band component of the baseband signal 113, monitors the spectrum over time of the baseband signal, and provides VGA feedback control to the first analog module 111 (e.g., low band front end) based on the monitored spectrum. Similarly, the second sub-band filter 134 or digital front end filters the out-of-band component of the baseband signal 133; monitor the spectrum over time of the baseband signal, and provides VGA feedback control to the second analog module 131 based on the monitored spectrum. The selective filtering modules (144, 154) (e.g., bandpass selective filtering module) extracts the signal from a targeted band (e.g., L2, L5 etc.). The NBI rejection systems (110, 130) are added to mitigate the PN demodulation degradation resulting from the NBI.

A band selection multiplexer 120 (e.g., band selection MUX) selects the sample stream from a band or one or more channels within a band that carries the targeted PN sequence. For example, to decode or demodulate the encoded information on an L1 channel, the band selection multiplexer 120 needs to select L1 band if the targeted PN sequence type is GPS L1 carrier (CA). The appropriate sample stream will be further processed by the GNSS channel module 145, which typically contains one or multiple carrier phase demodulators, the PN code generator sampled at multiple delayed phases, the binary offset subcarrier (BOC) modulator (used for modern GNSS signals such as GPS L1C, BeiDou B1C, Galileo E1 signals etc.), and multiple accumulators, to create a bank of in-phase (I) and quadra-phase (Q) measurements at an interval of millisecond (ms) or multiple milliseconds to drive the baseband tracking loop. The correction signals derived from the baseband tracking loops control the numerically controlled oscillators (NCOs) in the channel processing module 145 to maintain the synchronization between the received signal in the channel and the local replica of that channel.

The navigation processing module 155 takes the pseudo-range measurements and carrier phase measurements and other related information from the satellites to generate the positioning solution, which is used as a feedback to align the receiver crystal-grade clock with the satellite-based atomic grade clock; the solution also, combined with other information, generates the in-view satellites list to control the appropriate receiver resource allocation.

To enable a GNSS receiver to reject the WBI and NBI simultaneously, the first selective filtering module 144, the second selective filtering module 154, or an electronic data processor are configured to identify and to categorize the type of the interferences from the received sample stream, such as digital baseband signals (113, 133). The identification and categorization of the interference drives the AGC control strategy to reject different types of interferences in a tailored and effective fashion.

In general, the first NB rejection system 110, the second NB rejection system 130 or both comprise notch filters for rejecting NBI. The first NB rejection system 110 and the second NB rejection system 130 each comprise a notch filter that can be configured as a finite impulse response or infinite impulse response. For example, the goal of the notch filter is to extract the phase characteristics of the NBI, based on which, the notch filter can project or estimate the next received sample from the samples collected in the past. Using NBI, such as continuous-wave interference CW, given the phase step f*Ts (where f is the frequency of the CW and Ts is the sampling period) as a priori information (e.g., predefined data), the notch filter of the first NB rejection system 110, the second NB rejection system 130, or both can predict or estimate the next received sample using the sample received in the past. Therefore, WBI tends to degrade the accuracy of the first NB rejection system's and the second NB rejection system's estimation of such phase step, at least in the absence of compensation. The saturation of the ADC (11, 132) introduces the phase distortion, which in turn degrades the accuracy of first NB rejection system's and the second NB rejection system's estimation of such phase step. The phase distortion prevents a linear notch filter from accurately predicting the phase of the next received NBI sample. As a result, the GNSS receiver is configured to minimize the ADC saturation events of the ADC (112, 132) to favor the proper rejection of NBI. Accordingly, to minimize ADC saturation the AGC (143, 153) needs to adjust the gain to scale the waveform within the ADC input dynamic range of the ADC (112, 132).

In one embodiment, the first sub-band filter 114, the second sub-band filter 134 use pulse blanking method to reject the WBI. Over the duty cycle that WBI occurs, the short-term events of ADC saturation are detected within the ADC (112, 132). To optimize the blanking performance, the receiver is expected to maintain a constant AGC gain of the AGC (143, 153) that is determined or settled for the time period when the WBI is absent. If the AGC gain of the AGC (143, 153) is erroneously determined when WBI is present or when WBI events occur, most of the ADC dynamic range of the ADC (112, 132) is not used when the WBI is not present; hence, the GNSS receiver cannot fully utilize quantization accuracy of a ADC (112, 132) over the WBI-free environment. As a result, the first selective filtering module 144, the second selective filtering module 154, and/or the electronic data processor use a detection and blanking method that is generally limited to or aligned with the time period when the WBI is identified, to maintain a constant AGC gain and to zero the samples corrupted by the WBI.

As described above, in the presence of NBI, the AGC needs to adjust to make the input waveform compatible with the ADC input dynamic range. However, on the contrary, for WBI, the AGC needs to remain constant if the WBI is identified. Therefore, in this disclosure an innovative AGC control scheme is proposed in this disclosure to balance the trade-off for a constant and adjustable AGC gain of the AGC (143, 153).

Figure 1B:
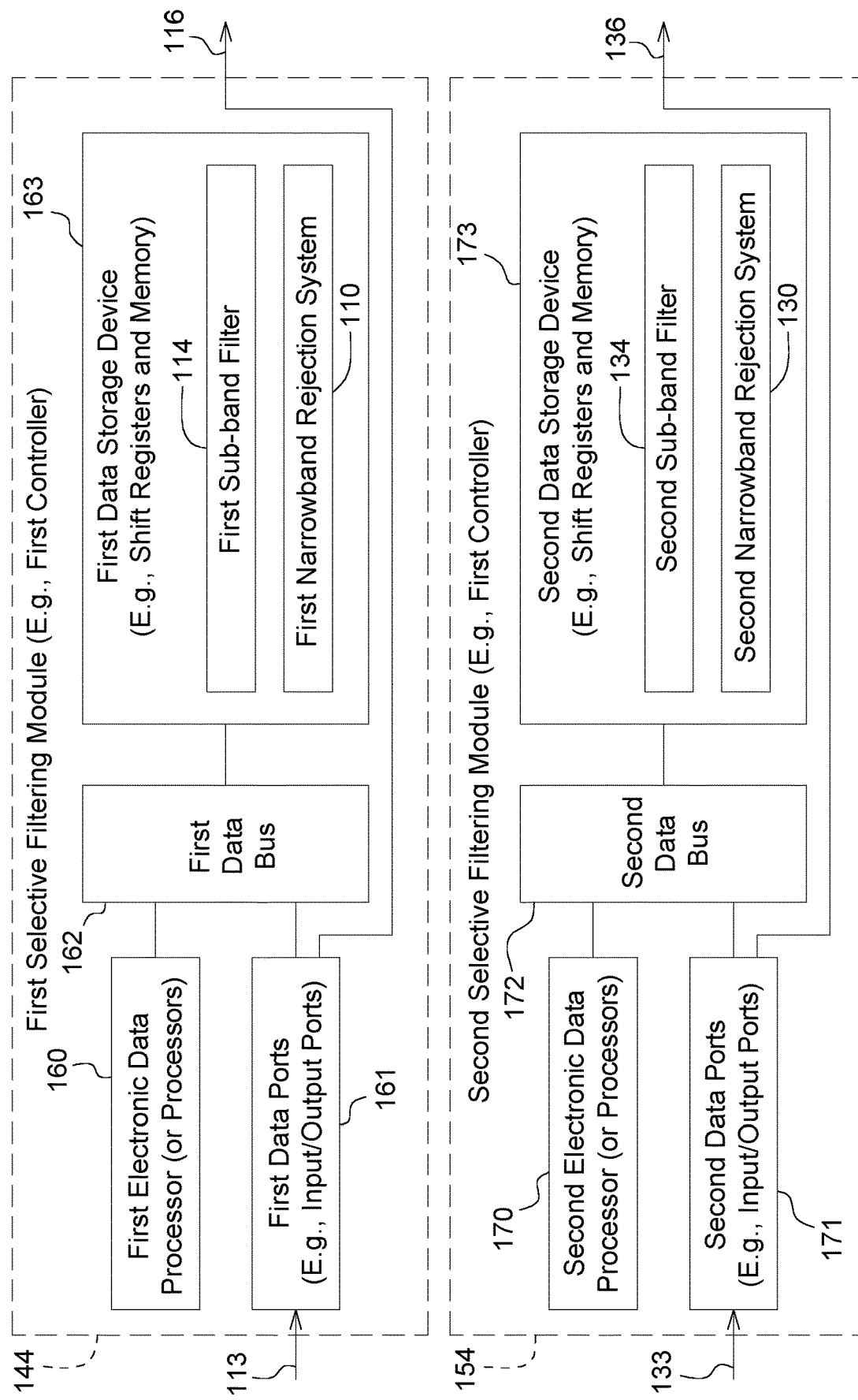
FIG. 1B is a block diagram a first narrowband rejection system, a first wide band rejection system, a second narrowband rejection system, and a second wide band rejection system of FIG. 1A in greater detail.

FIG. 1B is a block diagram the first selective filtering module 144 and a second selective filtering module 154. In one configuration, a first digital front end may provide an interface between an output of the ADC 112 and the first selective filtering module 144; a second digital front end may provide an interface between an output of the ADC 132 and the second selective filtering module 154. In another configuration the first digital front end is integral with and incorporated into the first selective filtering module 144; the second digital front end is integral with and incorporated in the second selective filtering module 154. The first selective filtering module 144 comprises a first sub-band filter 114 and a first NB rejection system 110 to support filtering of WBI, NBI, or both. The second selective filtering module 154 comprises a second sub-band filter 134 and a second NB rejection system 130 to support filtering of WBI, NBI, or both.

In FIG. 1B, the first selective filtering module 144 comprises a first electronic data processor 160, a first data ports 161, and first data storage device 163 coupled to a first data bus 162. The first electronic data processor 160, the first data ports 161 and first data storage device 163 may communicate data messages with each other via the first data bus 162, for example. In one embodiment, the first data storage device 163, may store filter parameters, filter coefficients, reference filter parameters, reference filter coefficients, and software instructions relative to adaptive filters, predictive filters, least minimum squares (LMS) search algorithms for filter parameters and filter coefficients, minimum mean square error (MMSE) search algorithms for filter parameters and filter coefficients, Steiglitz-McBride models for estimating or determining filter parameters and filter coefficients, and modified Steiglitz-McBride models for estimating or determining filter parameters and filter coefficients. As illustrated, the first data storage device may store software instructions or software module related to one or more of the following: a first NB rejection system 110 (e.g., a primary first adaptive notch filter, a secondary first adaptive notch filter,) and a first sub-band filter 114 (e.g., a first wide band filter).

In alternate embodiments, alone or cumulative with the above primary first adaptive notch filter, the secondary first adaptive notch filter, and the first wide band filter, the first data storage device 163 may store program instructions for any of the following: (a) filter emulation; (b) initializing, estimating, updating, resetting, storing and retrieving filter coefficients and filter parameters; (c) configuring, controlling, communicating operating digital circuitry (e.g., digital signal processor coupled to the first data ports 161) comprising delay lines, summers, shift registers, adders, and other digital components.

In FIG. 1B, the second selective filtering module 154 comprises a second electronic data processor 170, a second data ports 171, and second data storage device 173 coupled to a second data bus 172. The second electronic data processor 170, the second data ports 171 and second data storage device 173 may communicate data messages with each other via the second data bus 172, for example.

In one embodiment, the second data storage device 173, may store filter parameters, filter coefficients, reference filter parameters, reference filter coefficients, and software instructions relative to adaptive filters, predictive filters, least minimum squares (LMS) search algorithms for filter parameters and filter coefficients, minimum mean square error (MMSE) search algorithms for filter parameters and filter coefficients, Steiglitz-McBride models for estimating or determining filter parameters and filter coefficients, and modified Steiglitz-McBride models for estimating or determining filter parameters and filter coefficients. As illustrated, the second data storage device 173 may store software instructions or software module related to a second NB rejection system 130 (e.g., primary second adaptive notch filter and/or a secondary second adaptive notch filter) and a second sub-band filter 134 (e.g., second wide band filter)

In alternate embodiments, alone or cumulative with the above primary second adaptive notch filter and the secondary second adaptive notch filter, the second data storage device 173 may store program instructions for any of the following: (a) filter emulation; (b) initializing, estimating, updating, resetting, storing and retrieving filter coefficients and filter parameters; (c) configuring, controlling, communicating operating digital circuitry (e.g., digital signal processor coupled to the second data ports 171) comprising delay lines, summers, shift registers, adders, and other digital components.

Within the second data storage device 173, filter parameters, filter parameters and filter emulation, delay lines, summers, shift registers, adders, and other structures may be configured. As illustrated, the data storage device comprises a primary second adaptive notch filter and a secondary second adaptive notch filter.

In FIG. 1B, the first electronic data processor 160, the second electronic data processor 170, or both may comprise one or more electronic data processors. Each electronic data processor comprises one or more of the following: a microprocessor, a multi-core microprocessor, a microcontroller, a programmable logic device, a programmable gate array, an arithmetic logic unit, a Boolean logic unit, an electronic logic circuit or system, a digital circuit, a digital signal processor (DSP), and application specific integrated circuit (ASIC) or another data processing device. In one embodiment, the electronic data processor can execute software instructions stored in the data storage device 46. For example, the electronic data processor (160, 170) can execute software instructions to facilitate, support, incorporate, call, configure or emulate any of the following: digital delay lines, shift registers, memory registers, memory stacks, summers, adders, digital filter components, a digital notch filter, predictive or adaptive filter modules, filter parameters, filter coefficients, and artificial intelligence (AI) based control of adaptive filters.

In FIG. 1B, the first data storage device 163, the second data storage device 173 or both may comprise one or more data storage devices. Each data storage device (163, 173) may comprise one or more of the following: electronic memory, nonvolatile electronic memory, shift registers, memory stacks, delay lines, registers, nonvolatile random access memory, a magnetic storage device, an optical storage device, or any other device for storing and retrieving digital data and/or analog data.

As illustrated in FIG. 1B, the first data storage device 163 is capable of storing software instructions, such as software modules or components, logic and data structures, to realize the first sub-band filter 114 (e.g., first adaptive filter) and the first narrowband rejection system 110 (e.g., first adaptive notch filter). Further, the first sub-band filter 114 may have a passband magnitude versus frequency response to pass (selectively) one or more selected channels or sub-bands of the received satellite signals. The first narrowband rejection system 110 may have a complex magnitude versus frequency response with any of the following: (a) one or more rejection notches to attenuate NBI at discrete corresponding targeted frequencies; (b) multiple rejection notches to attenuate NBI, WBI or both within targeted rejection frequency ranges (e.g., over a corresponding continuous or discontinuous targeted rejection bandwidth); and (c) one or more bandpass characteristics (e.g., to attenuate NBI, WBI or both or) to pass desired or targeted components (e.g., PN modulation or other encoded information) of the received satellite signals to GNSS channel processing 145 and/or the navigation processing module 155 to yield position, velocity, attitude and/or motion data associated with the receiver system 100 (or its antenna 106).

In FIG. 1B, the first data storage device 173 is capable of storing software instructions, such as software modules or components, logic and data structures, to realize the second sub-band filter 134 (e.g., first adaptive filter) and the second narrowband rejection system 130 (e.g., first adaptive notch filter). Further, the second sub-band filter 134 may have a passband magnitude versus frequency response to pass (selectively) one or more selected channels or sub-bands of the received satellite signals. The second narrowband rejection system 130 may have a complex magnitude versus frequency response with any of the following: (a) one or more rejection notches to attenuate NBI at discrete corresponding targeted frequencies; (b) multiple rejection notches to attenuate NBI, WBI or both within targeted rejection frequency ranges (e.g., over a corresponding continuous or discontinuous targeted rejection bandwidth); and (c) one or more bandpass characteristics (e.g., to attenuate NBI, WBI or both or) to pass desired or targeted components (e.g., PN modulation or other encoded information) of the received satellite signals to GNSS channel processing 145 and/or the navigation processing module 155 to yield position, velocity, attitude and/or motion data associated with the receiver system 100 (or its antenna 106).

The first data ports 161 and second data ports 171 may comprise one or more of the following data ports or input/output data ports. Each data port (161, 171) may comprise a buffer memory and an electronic transceiver for communicating data messages to a network element or via a communications network, such as the Internet or a wireless communications network (e.g., cellular phone network, or high-bandwidth smartphone data communications wireless network).

In one embodiment, in the first digital signal path 256, the first data ports 161 may support the receipt and data processing of digital baseband signals from the first ADC 112 in the first selective filtering module 144. Meanwhile, in the second digital signal path 257, the second data ports 171 may support the receipt and data processing of digital baseband signals from the second ADC 132 in the second selective filtering module 154.

In alternate embodiments, one or more nearby particular receiver systems 100 (e.g., GNSS receivers) may be associated with first wireless communication devices that transmit or share filter coefficients and/or geographical locations associated with NBI at that nearby particular GNSS receivers that are associated with second wireless communication devices, where the wireless communication devices are coupled to the first data ports, the second data ports, or both.

Figure 2:
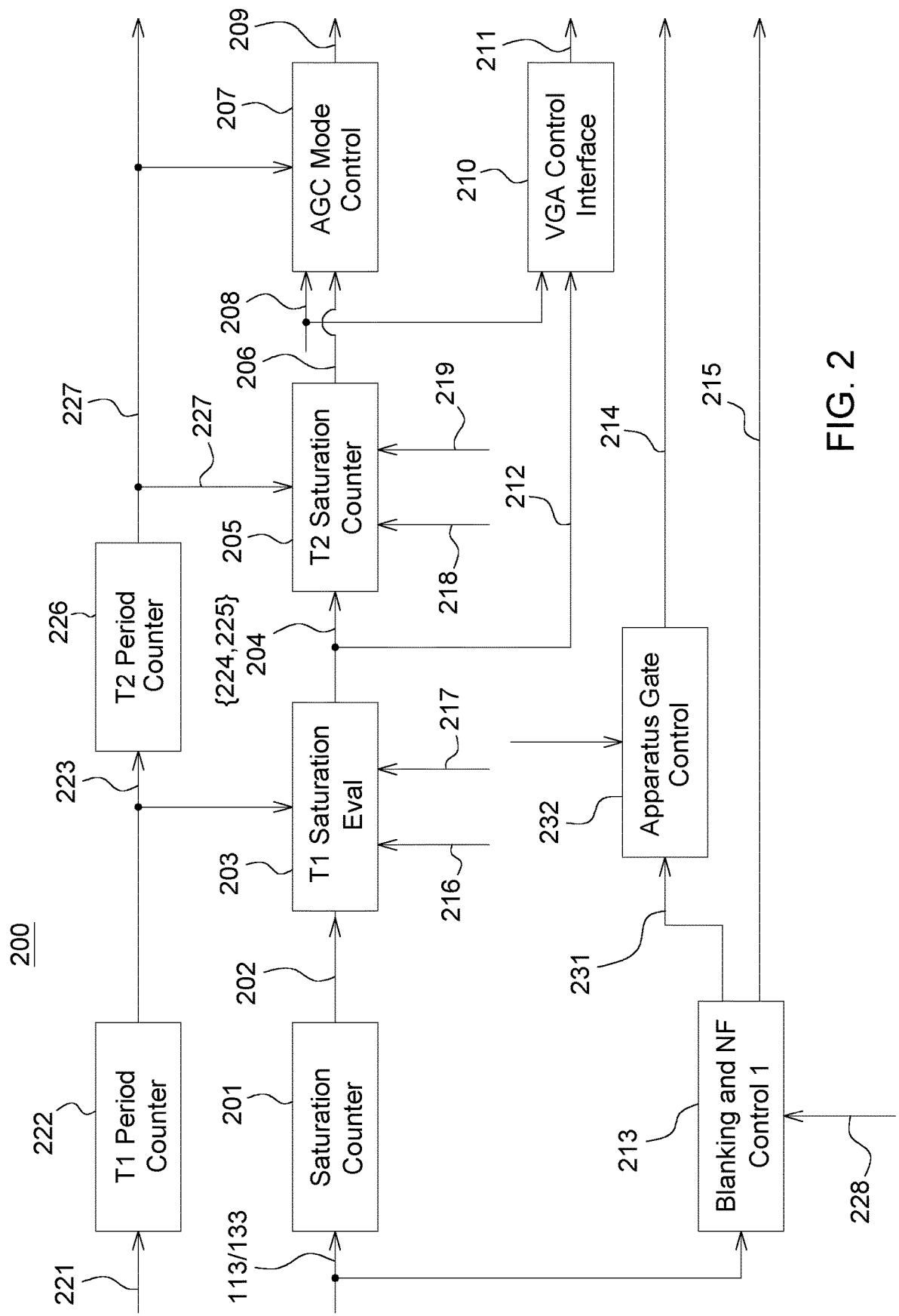
FIG. 2 is a block diagram of one embodiment of a receiver system with automatic gain control (AGC) and blanking control for an interference rejection system.
Figure 3:
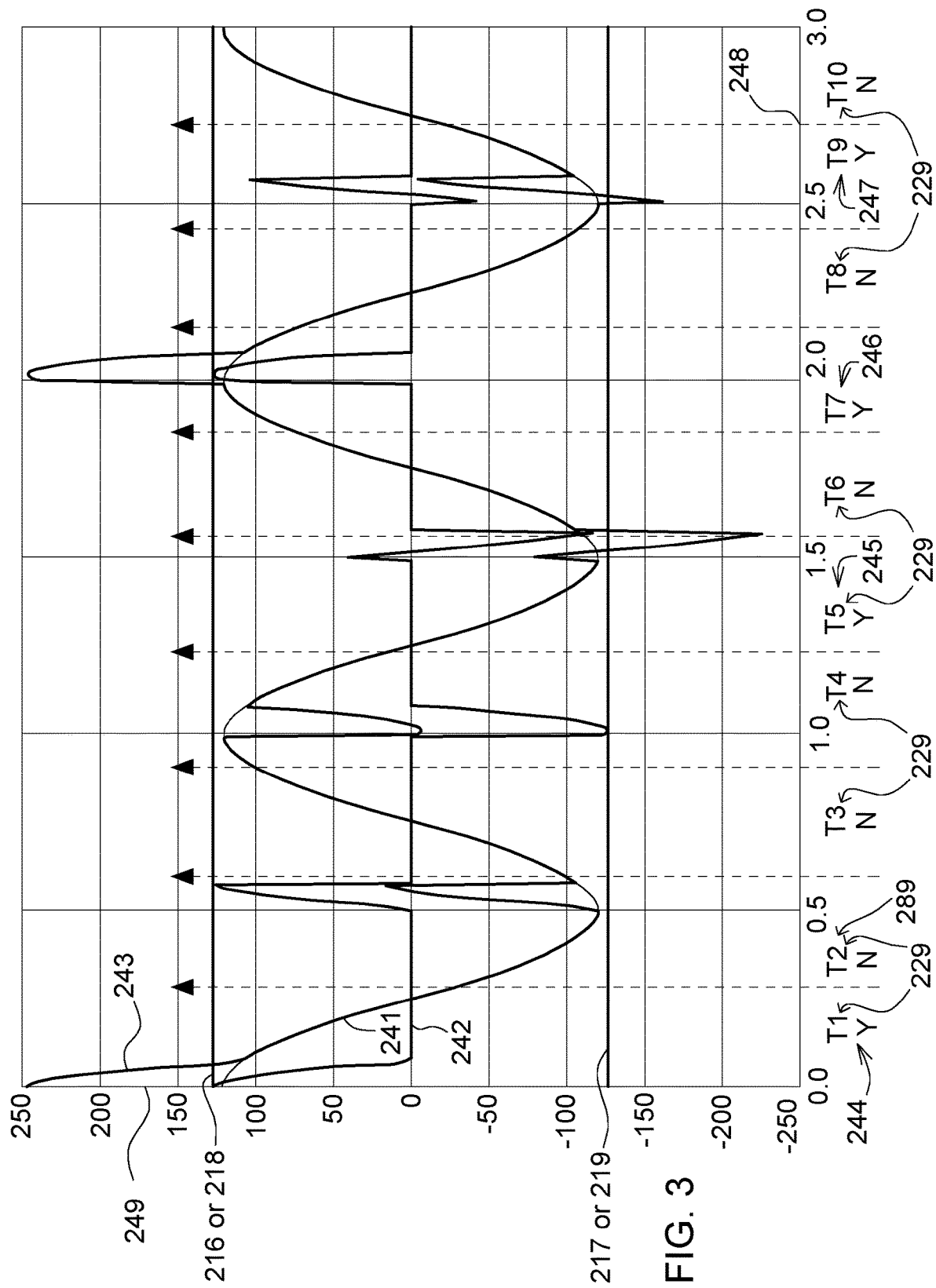
FIG. 3 is one possible example of an illustrative magnitude versus time response that illustrates saturation of the analog-to-digital converter (ADC) because of wide-band interference and clipping of the received signal in the absence of compensation by AGC in an AGC mode.
Figure 4:
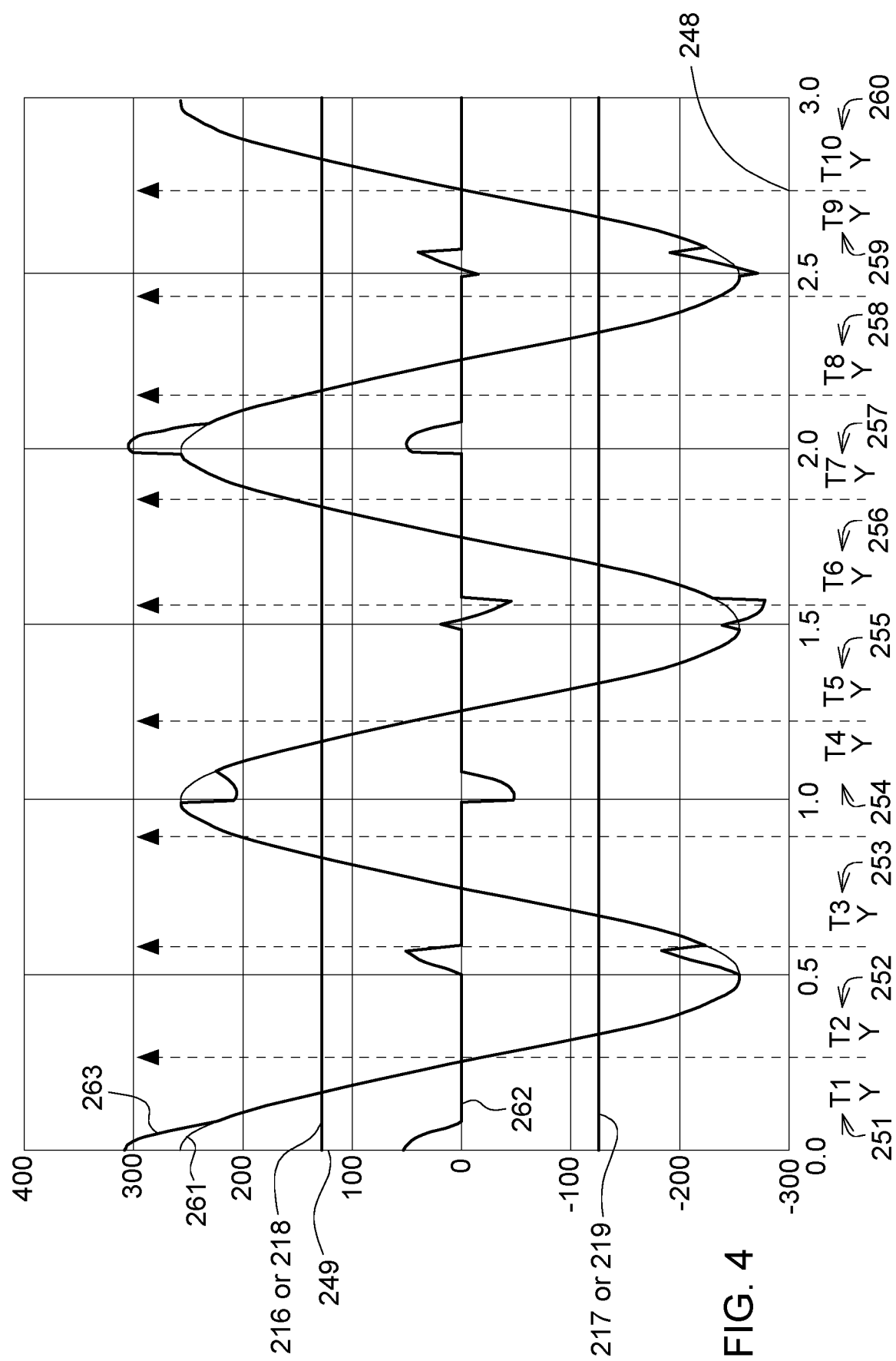
FIG. 4 is one possible example of an illustrative magnitude versus time response that illustrates saturation of the analog-to-digital converter (ADC) because or narrowband interference and clipping of the received signal in the absence of compensation by AGC in an AGC mode transition to a filter adjustment mode.

The AGC and WBI control strategy are illustrated in FIG. 2 in conjunction with FIG. 3 and FIG. 4. The method of FIG. 2 may be executed on the computer hardware illustrated in FIG. 1B, of example. Based on the proposed method, there are two examples displayed in FIG. 3 and FIG. 4, respectively, to explain the effectiveness of the control system 200 of FIG. 2.

In FIG. 2, the electronic data processor manages a clock signal 221 that triggers a T1 period counter 222 to increment (e.g., increment the count by one). Further, the T1 period counter 222 generates a respective T1 epoch signal 223 when or each time interval a corresponding first period (e.g., predefined T1 period) is triggered. As used in this document, an epoch is a discrete measurement time period or sampling interval of the carrier phase of received satellite signal or the received GNSS signal. An epoch may be measured with reference to a reference time and date of a particular GNSS system (e.g., GPS time) or as an offset to coordinated universal time.

The electronic data processor or T2 period counter 226 manages a T2 epoch signal 227. Every T1 epoch is counted by the T2 period counter 226, which generates the T2 epoch signal 227 when or each time interval a corresponding second time period (e.g., pre-defined T2 period) is triggered.

At every clock cycle (e.g., leading or trailing edge of pulse within a pulse train) of the clock signal 221, the input samples of the ADC (112, 132) or digital baseband signals (113, 133; e.g., data samples) outputted by the ADC (112, 132) are evaluated by a saturation counter 201 (e.g., first vector saturation counter), which counts and accumulates the magnitude of one or more samples less than a lower threshold or greater than an upper threshold. If there are an excess of samples with small magnitude below the lower threshold, it is called an over-compression violation, and implies the deficiency of the AGC gain of the AGC (143, 153). Conversely, if there are excess of samples with a greater magnitude above the upper threshold, it is called overflow violation, indicates excessive gain or magnitude saturation of the AGC gain of the AGC (143, 153).

At each T1 epoch signal 223, the data processor or T1 saturation evaluator 203 (e.g., T1 saturation module) evaluates the vector signal 202 (or accumulated counts) of the over-compression violations and overflow violations of one or more samples. The data processor or the T1 saturation evaluator 203 sends a vector signal 204 (e.g., vector event signal) to the T2 saturation counter 205 (e.g., T2 saturation counter module) if the accumulated count of the overflow violations exceeds a first threshold 216 (e.g., upper pre-defined threshold); the first overflow component 224 (e.g., first overflow flag or first overflow violation signal) of the vector signal 204 is triggered. However, the data processor or the T1 saturation evaluator 203 generates a first over-compression component 225 (e.g., first over-compression flag, first over-compression signal, or over-compression signal) of the vector signal 204 if the accumulated count of over-compression violations exceeds the second threshold 217 (e.g., lower pre-defined threshold). The T1 saturation evaluator 203 or data processor repeats the foregoing process at every T1 epoch signal 223.

Over the second time period (e.g., pre-defined T2 period), the electronic data processor or the T2 saturation counter 205 (e.g., T2 saturation counter module) accumulates a multiple of the violation vector signal 204 to count the violations. At each T2 epoch signal 227, if the overflow violation exceeds the third threshold 218 (e.g., upper pre-defined threshold), the data processor or T2 saturation counter 205 triggers the second overflow component (e.g., second overflow violation flag) of the vector signal 206. However, the data processor or T2 saturation module 205 turns on the second over-compression component (e.g., second over-compression violation flag) of the signal 206 if the over-compression violation exceeds the fourth threshold 219 (e.g., lower predefined threshold). The electronic data processor or T2 saturation counter 205 keeps repeating the foregoing process at every T2 epoch signal 227.

At the first T2 epoch of the T2 epoch signal 227, the data processor or AGC mode control module 207 determines a second AGC mode signal 209 to be used for the second T2 epoch or T2 period. The data processor or AGC mode control module 207 receives inputs of the vector signal 206 counting the overflow violations and over-compression violations, together with the first AGC mode signal 208 (e.g., for T1 epoch or T1 period) and outputs the second AGC mode signal 209 used for the second T2 epoch or second T2 period based on the inputs of the vector signal 206 counting the overflow violations and over-compression violations and the first AGC mode signal 208.

As shown in Table 1, given the first AGC mode signal of the AGC (143, 153) is in steady state mode; the data processor or AGC mode control module 207 switches the second AGC mode signal 209 to an adjust mode if, at the first T2 epoch 226, either the overflow component of the vector signal 206 is "on" (e.g., active flag, active state or enabled status) or the over-compression component of the vector signal 206 is "on" (e.g., active flag, active state or enabled status). However, the data processor or AGC mode control module 207 outputs an unchanged second AGC mode signal 209 in the steady state if both the components of the vector signal 206 are "off" (e.g., inactive flag, active state or disabled status).

As shown in Table 1, the first AGC mode signal 208 may comprise a steady state mode or an adjust mode; similarly, the second AGC mode signal 209 may comprise a steady state mode or an adjust mode. In Table 1, if the first AGC mode signal 208 is in a steady state mode, the second AGC mode signal 209 switches to the adjust mode if the overflow component of vector signal 206 is "on" or the over-compression component of the vector signal 206 is "on"; otherwise the second AGC mode signal 209 remains in a steady state mode. For example, as shown the second AGC mode signal 209 remains in a steady state mode if both the overflow component of vector signal 206 and the over-compression component of the vector signal 206 are "off."

If the first AGC mode signal 208 in in the adjust mode, the second AGC mode signal 209 remains unchanged (e.g., maintains its state intact) if, at the first T2 epoch 226, either the overflow component of vector signal 206 is "on" or the over-compression component of the vector signal 206 is "on." However, if the first AGC mode signal 208 in in the adjust mode, the second AGC mode signal 209 switches to "steady state" if both components of the vector signal 206 are "off."

In one configuration, the second AGC mode signal 209 copies or propagates the first AGC mode signal 208 and is used as the AGC mode, or second AGC mode signal 209, for the second T2 period if the overflow signal and over-compression conditions are satisfied according to Table 1. The above process repeats at every T2 epoch of the T2 epoch signal 227 (e.g., during a period).

TABLE 1

AGC Mode Signal 208 and 209 Transition Table

| AGC Mode Signal 208 | Overflow signal in vector signal 206 | Over-compression signal in vector signal 206 | AGC Mode Signal 209 |
|---|---|---|---|
| Steady State | ON | X | Adjust |
| Steady State | X | ON | Adjust |
| Steady State | OFF | OFF | Steady State |
| Adjust | ON | | Adjust |
| Adjust | | ON | Adjust |
| Adjust | OFF | OFF | Steady State |

TABLE 2

AGC Adjustment Signal 211

| AGC Mode Signal 208 | Overflow signal 224 in vector signal 204 | Over-compression signal 225 in vector signal 204 | AGC Adjust Signal 212 at T1 Epoch |
|---|---|---|---|
| Steady State | | | No Adjust |
| Steady State | | | No Adjust |
| Adjust | | >Overflow 216 | Decrement Gain |
| Adjust | | >Over-compression 217 | Increment Gain |

The VGA (e.g., variable gain amplifier) control interface module 210 receives input data of the first AGC mode signal 208 and the output signal 212 (e.g., AGC adjust signal) of the T1 saturation evaluator 203. The VGA control interface module 210 outputs a control signal 211 (e.g., gain control signal) based on the input data of the first AGC mode signal 208 and the output of the T1 saturation evaluator 203. For example, the VGA control interface module 210 may contain logic that follows Table 2, where Table 2 illustrates the decision to adjust the AGC gain using the control signal 211.

In Table 2, if the first AGC mode signal 208 is in a steady state mode, regardless of the first overflow component 224 (e.g., overflow violation signal) or first over-compression component 225 (e.g., over-compression violation signal) at every T1 epoch (e.g., of the T1 epoch signal 223), the AGC gain remains constant, unchanged, or intact. Under such condition, the overflow violation is regarded as an impact from the short-term pulse like WBI, and the over-compression violation is treated as the intermittent WBI. However, in accordance with Table 2, the first AGC mode signal 208 is in an adjust mode, at every T1 epoch, the VGA control interface module 210 (e.g., AGC interface control module), upon receiving the first overflow component 224 (e.g., overflow violation signal), encodes the gain control signal 211 with a gain decrement command; VGA control interface module 210 (e.g., the AGC interface control module), upon receiving the first over-compression component 225, encodes the gain control signal 211 with a gain increment command. To each decrement or increment command, the electronic data processor, first selective filtering module 144, second selective filtering module 154, or front end will adjust the AGC gain by a single or multiple of basic gain steps.

In FIG. 2, the blanking and NF (notch filter) control module 213 asserts or enables the baseband signal (113, 133) or ADC output signal of the ADC (112, 132). If the magnitude of the ADC sample exceeds a third threshold 218 (e.g., upper predefined threshold, or blanking threshold, or overflow event threshold), the blanking and NF control module 213 will be reset the ADC sample to "zero" magnitude consistent with a blanking operation or blanking process; otherwise the ADC sample remains unchanged.

Blanking refers to the suppression of observed digital signal values and/or insertion of null values (e.g., zero values) for observed signal magnitudes in the digital domain for the duration of pulse-like interference. For example, in a blanking process the signal values of the received GNSS signal: (a) may be nulled or zeroed out for a duration of pulse-like interference (e.g., approximately 10 to 100 milliseconds) to reduce, attenuate, notch out, or filter out WBI, (b) may be limited or clipped to a lower magnitude level less than blanking threshold magnitude for a duration of pulse-like interference to reduce, attenuate, notch out, or filter out WBI, and/or (c) may be assigned a signal value based on estimated noise floor for a duration of pulse-like interference to reduce, attenuate, notch out, or filter out WBI. As a result, a filtered signal 215 (e.g., new filtered sample stream) can be created for future processing that has an attenuated or reduced WBI component. As previously discussed, given AGC in the steady state mode, the short-term overflow events indicate the pulse-like WBI is detected.

Similar to the presence of overflow saturation, a reset of the baseband signal (113, 133) from the ADC (112, 132) can introduce a discontinuity, such as phase jump or phase jitter that negatively impact the performance and stability of the notch filter of the first NB rejection system 110, the second NB rejection system 130, or both. Therefore, the apparatus gate control module 232 generates a sample reset signal 231 whenever a sample reset occurs to compensate for the potential phase discontinuity or phase jump in the baseband signal (113, 133) that may result from blanking of the WBI by the first sub-band filter 114, the second sub-band filter 134, the electronic data processor, the digital front end, or the digital GNSS band selective filter (115/135) of FIG. 5. Throughout the document, "115/135" means signal 115, signal 135 or both signals 115 and 135.

In FIG. 13 through FIG. 16, inclusive, further defines the apparatus gate control module 232 to facilitate a fast method to resettle or return to the steady state of a notch filter of the first NB rejection system 110, the second NB rejection system 130, or both. The fast resettlement approach relies on the received GNSS signal where the phase discontinuity can be detected. The apparatus gate control module 232 or data processor (160, 170) is configured to prevent the disturbance due to the frequent shuffling of the sample reset signal 231. At the first sample epoch T1 (e.g., Ts1), the apparatus gate control module 232 resets the sample trigger or input of the first reset signal 231. Further, the apparatus gate control module 232 or data processor (160, 170) enables the gated sample reset signal 214 and starts counting a first "reset" period predefined by the signal 232. If before the predefined reset period expires, the second reset signal 231 occurs, apparatus gate control module 232 resets and restarts counting a second reset period (e.g., next reset period or reset period N+1); otherwise, the gated reset signal 214 is disabled after the first reset period (e.g., prior reset period or reset period N) expires.

FIG. 3 is one possible example of an illustrative magnitude-versus-time response that illustrates saturation of the analog-to-digital converter (ADC) because of wide-band interference and clipping of the received signal in the absence of compensation by AGC in an AGC control mode. The vertical axis indicates signal magnitude 249 or amplitude (e.g., expressed in millivolts or equivalent dBm for a respective receiver antenna terminal impedance) of the received GNSS carrier signal, whereas the horizontal axis represents time 248 (e.g., expressed in seconds). Like reference numbers in FIG. 2 and FIG. 3 indicates like features or elements.

FIG. 3 illustrates an example of AGC mode control of the AGC mode control module 207 (e.g., AGC mode controller) or AGC (143, 153) if the overflow events of the saturation counter 201 results from WBI, such as a pulse-like WBI. FIG. 3 assumes the following one or more conditions: (1) the AGC already settles or stabilizes, such as where AGC mode signal 208 is at a steady state mode for the digital baseband (113, 133) or ADC samples; (2) the digital baseband or ADC samples comprise a strong narrowband interference (NBI) signal 241 that exceeds a threshold signal strength; and (3) each Ti (i=1 . . . 10) represents a T1 epoch; and (4) there are a set (e.g. ten) of T1 epochs in the illustrated time period along the horizontal axis. In one configuration, each ten T1 epochs represents a corresponding T2 period or T2 epoch.

However, in an alternate embodiment, each Ti (i=1 . . . 10) may represent a T2 epoch, that comprises one or more (e.g., ten) T1 epochs.

In FIG. 3, starting from epoch 244, a pulse-like wideband interference WBI signal 242 is introduced or received by the GNSS receiver. The WBI signal 242, the NBI signal 241 and target received GNSS carrier signal form the composite waveform 243.

In one embodiment, the electronic data processor (160, 170) and saturation counter 201 determines and counts samples for corresponding sampling intervals that that digital baseband signal or received GNSS analog input (e.g., low band L1 signal or high band L2 signal) to the ADC exceeds a threshold maximum signal level, such as the first threshold 216 or the third threshold 218 (e.g., upper limit(s)). For example, there may be one or more multiple sampling intervals per epoch. Similarly, the data processor and saturation counter 201 determines and counts samples for corresponding sampling intervals that that digital baseband signal or received GNSS analog input (e.g., low band L1 signal or high band L2 signal) to the ADC exceeds an absolute value of threshold minimum signal level (e.g., or is lower than the threshold minimum signal level), such as the second threshold 217 or fourth threshold 219 (e.g., lower limit(s)).

The data processor (160, 170) and T1 saturation evaluator 203 determines and counts each epoch (e.g., which may comprise one or more sampling intervals) that that digital baseband signal or received GNSS analog input (e.g., low band L1 signal or high band L2 signal) to the ADC exceeds a threshold maximum signal level based on first threshold 216, such as an upper predefined threshold. For example, the T1 saturation evaluator 203 increments a count or cumulative count for each epoch that that digital baseband signal or received GNSS analog input (e.g., low band L1 signal or high band L2 signal) to the ADC exceeds a threshold maximum signal level (e.g., first threshold 216 or upper predefined threshold) and/or a exceeds the absolute value of a threshold minimum signal level (e.g., second threshold 217). In one configuration, the cumulative count is maintained or accumulated over multiple epochs, such as multiple T1 epochs per each T2 epoch. The T1 saturation evaluator 203 or data processor may represent or express the overflow saturation count over the time period or series of T1 epochs as a probability of overflow.

In this sample figure, at every successive period of T1 epochs, the first overflow component 224 of the vector signal 204 is accumulated in the T2 saturation counter 205. The T2 saturation counter 205 (e.g., vector counter) counts the first overflow component 224 of the vector signal 204. As illustrated in the example of FIG. 3 solely for explanatory purposes, the electronic data processor (160, 170) or the T2 saturation counter 205 increments the overflow saturation count to four, corresponding to the four saturated periods of T1 epochs (e.g., or, in an alternate embodiment T2 epochs), which are labeled period T1 (244), period T5 (245), period T7 (246), and period T9 (247) where the overflow saturation happens. Along the horizontal axis of time 248 below period T1 (244), period T5 (245), period T7 (246) and period T9 (247), a "Y" indicates yes for an overflow saturation state (e.g., count increment) during (or after) the corresponding T1 epochs (e.g., or, in an alternate embodiment T2 epochs) within each corresponding period. In practice, the data processor or the T2 saturation counter 205 may determine an actual overflow saturation count, which may differ from the illustration of FIG. 3.

In an alternate embodiment, any saturated T2 epoch can refer to an overflow-saturated epoch comprising one or more T1 epochs (e.g., up to ten T1 epochs) with a corresponding Y or yes for respective saturation state; where "N" (along the horizontal axis of time 248) indicates no for overflow saturation state during the corresponding T1 epochs within each corresponding period (e.g., each unsaturated T2 epoch, which can refer to no overflow-saturated epoch comprising ten corresponding T1 epochs).

If data processor (160, 170) or AGC mode control module 207 (e.g., AGC mode controller) or AGC (143, 153) determines the above probability of overflow (or corresponding accumulated count of the first overflow component 224 of the vector signal 204) is within the duty cycle of the in-scope WBI candidates based the thresholds (e.g., not exceeding the third threshold 218), the second AGC signal mode signal 209 remains unchanged versus the first AGC mode signal 208 for first period (e.g., of T1 epochs from a first T1 epoch to a tenth T1 epoch, which can be called the first T2 epoch or previous T2 epoch), and is used for the second period (e.g., of an eleventh T1 epoch to a twentieth T1 epoch, which can be called the T2 epoch period or next T2 epoch).

In certain configurations, regardless of the overflow saturation state, along the time 248 axis, each next successive period of one or more T1 epochs is labeled as $T_{X+1}$, where $T_X$ (e.g., 229) is the previous period of one or more T1 epochs (e.g., ten T1 epochs in some configurations), where $T_{X+1}$ (e.g., 229) is the next period of one or more T1 epochs after the previous T1 period of one or more T1 epochs, and where X is any positive integer greater than or equal to two. The T1 period 244 is followed by a the T2 period 289 (which is different than a T2 epoch if each $T_X$ epoch has a duration of one T1 epoch, rather than ten T1 epochs as in certain alternate embodiments).

FIG. 4 is one possible example of an illustrative magnitude versus time response that illustrates saturation of the analog-to-digital converter (ADC) because or narrowband interference and clipping of the received signal in the absence of compensation by AGC in an AGC mode transition to a filter adjustment mode. The vertical axis indicates signal magnitude 249 or amplitude of the received GNSS carrier signal (e.g., expressed in millivolts or equivalent dBm for a respective receiver antenna terminal impedance), whereas the horizontal axis represents time 248 (e.g., in seconds).

FIG. 4 illustrates an example of AGC mode control of the AGC mode control module 207 (e.g., AC mode controller) or AGC (143, 153) if the overflow events results from an NBI. FIG. 4 assumes the following one or more conditions: (1) the AGC has already settled or the first AGC mode signal 208 is in a steady state mode for the received ADC input samples or digital baseband signals (113, 133) which consists of the PN signal (e.g., target GNSS carrier signal with PN modulation) and pulse-like WBI 262; (2) each Ti (i=1 . . . 10) represents a T1 epoch; (3) there are 10 T1 epochs in a T2 epoch or T2 period.

However, in an alternate embodiment, each Ti (i=1 . . . 10) may represent a T2 epoch, that comprises one or more (e.g., ten) T1 epochs.

Starting from T1 epoch 251, a narrowband interference (NBI) signal 261 is introduced or received. The NBI 261, the wideband interference (WBI) 262 and the target received GNSS signal (e.g., with PN modulation) form a composite waveform 263. In FIG. 4, at every T1 epoch (labeled epoch periods 251, 252, 253, 254, 255, 256, 257, 258, 259, and 260) the first overflow component 224 of the vector signal 204 is accumulated in the T2 saturation counter 205 (e.g., vector counter). At the tenth T1 epoch, which defines the T2 epoch 227 from the first T1 epoch period to the tenth T1 epoch period 260, the overflow saturation counts up to ten, corresponding to any T1 epoch periods (251 to 260, inclusive) where the overflow happens during one or more T1 epochs. As the probability of the overflow saturation exceeds any duty-cycle of any in-scope WBI candidates (e.g., exceeding the third threshold 218), the second AGC signal mode signal 209 switches to an adjustment mode for the next period or T2 period (e.g., second T2 period comprising the 11th T1 epoch to the 20th T1 epoch), rather than the steady state mode signal (e.g., first mode AGC signal 208) for the previous period or T1 period (e.g., first T2 period comprising the first ten T1epochs).

Consistent with the adjustment mode indicated by the above probability of the overflow saturation of FIG. 4, starting from the second T2 period (e.g., eleventh T1 period that is not illustrated, where each epoch period represents one T1 epoch) where the AGC mode signal 208 is in the adjustment mode, the AGC mode control module 207 or AGC (143, 153) decrements the gain to compress the composite waveform 263 within the ADC input dynamic range or specified bandwidth of the ADC (112, 132).

After the adjustment mode in the second T2 epoch (e.g., not shown in FIG. 4) as discussed above in conjunction with FIG. 4 and if overflow saturation counts to four as illustrated by FIG. 3, in the third T2 epoch the second AGC mode signal 209 or AGC (143, 153) switches back (e.g., resets or reverts) to a steady state mode for the fourth T2 period versus the mode signal (e.g., first AGC mode signal 208 or second AGC mode signal 209) in adjust mode for the second T2 epoch (e.g., second period) and the third T2 epoch (e.g., third period.)

In conjunction with FIG. 2 through FIG. 4, inclusive, and the accompanying text, the AGC mode transition and gain adjustment process of the AGC mode control module 207, or AGC (143, 153) can be repeated when the GNSS receiver is active or on to reduce or mitigate the deleterious effects of NBI, or pulse-like WBI.

Figure 5:
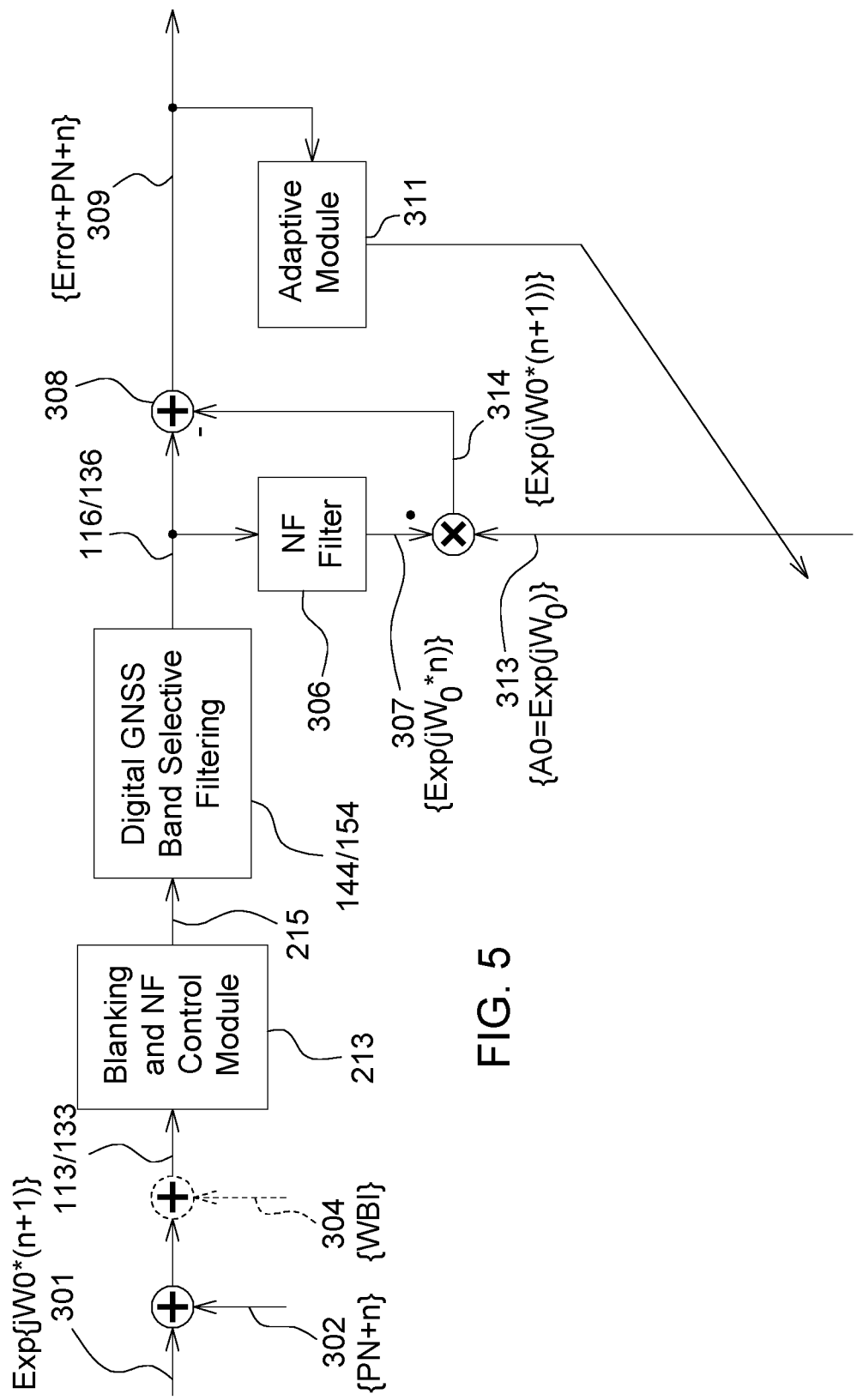
FIG. 5 is a block diagram of one embodiment of filter system that incorporates an adaptive narrowband interference rejection and wide-band interference rejection.
Figure 6:
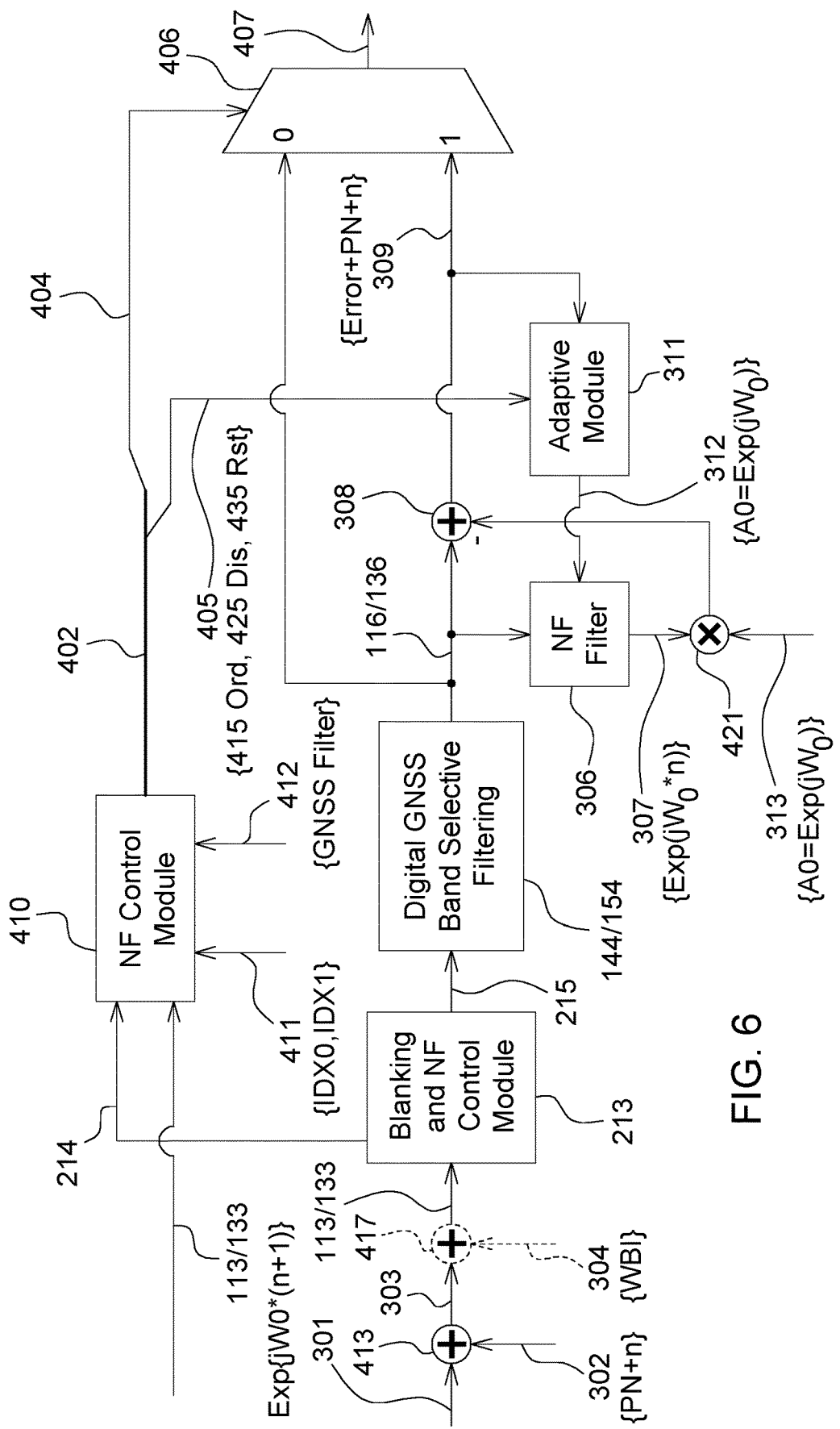
FIG. 6 is a block diagram of one embodiment of filter system that incorporates an adaptive narrowband interference rejection and wide-band interference rejection based on environmental perception of the interfering signal with respect to the received signal.

FIG. 5 illustrates an block diagram of an integrated system for NBI and WBI rejection that addresses the potential phase jump problem. FIG. 5 illustrates an integrated system that is configured to reject both NBI and WBI, where the integrated system may comprise the first selective filtering module 144, the second selective filtering module 154, or both. The ADC output signal or digital baseband signals (113, 133) may consist of three components: (1) the NBI signal 301, (2) the PN sequence (that modulates the GNSS carrier signal) and noise signal 302, (3) and the WBI signal 304. As illustrated in FIG. 6, reference numeral 302 represents both the pseudorandom noise code (PN) of the GNSS carrier signal and the noise signal 302 (n).

The blanking and notch filter control module 213 (of FIG. 2) detects the suspect segments of signal (113, 133), which may be corrupted by the WBI. When the blanking enable signal 228 or logic level is provided to the blanking and notch filter control module 213, the detected suspect segments are blanked (e.g., set to zeros or other predefined values) to form a new filtered signal 215 with reduced or rejected WBI signal component 304.

In FIG. 5, the digital selective filtering module (144, 154; e.g., digital selective filter or bandpass filter) may comprise the first sub-band filter 114 and the second sub-band filter 134 of FIG. 1A. In the embodiment illustrated in FIG. 5, the system assumes that the NBI signal 301 and WBI signal 304 share the same frequency spectrum with the PN code sequence and noise signal 302. Therefore, the resultant signal (116, 136), extracted by the digital selective filtering module (144,154) from a filtered signal 215, such as a wideband sample signal (e.g., where the WBI is blanked), comprises the NBI signal 301, the PN sequence and noise signal 302.

In FIG. 5, the notch filter 306 may comprise the first NB rejection system 110 and the second NB rejection system 130 of FIG. 1A. The notch filter 306 has an output notch signal that is mixed by mixer with a reference signal to provide an input signal 314 to summer 308. As illustrated, an unnotched resultant signal (116, 136) from the digital selective filter (144, 154) and the input signal 314 are summed by summer 308 to provide an input to an adaptive module 311 for minimizing NBI and error in the received GNSS signal that comprises error, PN, and noise.

At the first sample epoch, the notch filter 306 recursively extracts the NBI component and generate the estimation of the current NBI signal 307. The notch filter 306 facilitates generation of the tap vector signal 313 sampled at the first epoch. At the second sample epoch, the notch filter 306 combines the current NBI signal 307, $e^{j\omega_0 * n}$ (e.g., current NB signal for the current epoch n, such as a first epoch) and the tap vector signal 313, $A_0 = e^{j\omega_0}$, to generate the NBI estimation 314 which, in the ideal case, well matches the NBI component (e.g., next NBI signal or the next epoch, n+1, such as a second epoch) of the signal (116,136) sampled at the second epoch. Then, the NBI component (e.g., next NBI component 314) in the signal (116, 136) is removed by the adder or summer 308 and results in a composite GNSS signal 309, which is composed of the noise, the PN sequence and the residual errors. To the extent that the system of FIG. 5 significant removes the NBI component from the resultant signal (116,136; e.g., received signal or digital samples thereof), the filtered composite GNSS signal 309 is noise like, which drives the adaptive module 311 to update the tap vector signal 313 to repeat the process for the third sample epoch. The process discussed in conjunction with FIG. 5 can be repeated every sampling interval or sampling clock.

The system of FIG. 5 can be applied to reduce the phase jump that tends to be associated with combined filtering of WBI and NBI in some GNSS receivers. NBI 301 is a signal component of the received composite GNSS signal. The mathematical model of a continuous wave (CW) interference, which is a simplified model of NBI, can be represented as follows:

$$J_{NB}(k) = A_{NB} e^{j\omega_0 k}, \text{ where} \qquad \text{Equation 1}$$

k represents the kth sample epoch, $J_{NB}(k)$ is a time series of epochs or serial representing the NBI, $A_{NB}$ denotes the amplitude of the NBI (e.g., during each corresponding epoch k), and $\omega_0$ denotes the normalized angle frequency of the NBI (e.g., associated with the corresponding epoch k).

In FIG. 5, $\omega_0$ may be indicated as $W_0$, where $\omega_0$ and $W_0$ are regarded as equivalent terms. Assume the NBI signal 301, the WBI signal 304, and the PN code and noise signal 302 share a common frequency spectrum and are within the passband of the digital band selective filtering module (144, 154), the first sub-band filter 114, and/or the second sub-band filter 134, such that the resultant signal (116,136) at the filter output can be written as:

$$r(k) = bk(k)\{PN(k) + J_{NB}(k) + J_{WB}(k) + n(k)\}, \text{ where} \qquad \text{Equation 2}$$

r(k) denotes the signal (116,136) observed by an individual GNSS band (e.g., first sub-band, second sub-band or both) during a corresponding epoch k, PN(k) is the GNSS pseudorandom sequence (e.g., code modulating a GNSS carrier signal) during the corresponding epoch k, n(k) is the thermal noise disturbance during the corresponding epoch k, $J_{NB}(k)$ is the narrowband interference signal (301) during the corresponding epoch k, $J_{WB}(k)$ denotes the wideband interference signal (304) during the corresponding epoch k, and bk(k) is a blanking sequence for the corresponding epoch k with value set of {0, 1}, where 0 in the value set means an overflow saturation is detected by blanking and NF control module 213 and the data samples of baseband signals (113, 133) has been reset, and 1 in the value set implies the data sample(s) of baseband signals (113, 133) is/are passed for processing (e.g., by the narrowband rejection system (110, 130) where material/detectable pulse-like WBI is not present).

In FIG. 5, if the notch filter 306 settles in steady state mode and if blanking function of the blanking and NF control module 213 is not active or in effect, then the tap vector signal 313 accurately represents the phase step of $e^{j\omega_0}$, which is the phase difference between the second NBI sample and the first NBI sample. The notch filter 306 (e.g., adaptive notch filter subsystem) and vector signal 313 are well-suited to predict the NBI at kth epoch using the samples received before kth epoch. The adaptive module 311 of FIG. 5 may comprise a Kalman filter, a modified Kalman filter, a predictive filter or artificial intelligence predictive model for NBI prediction process. For example, the adaptive module 311 or Kalman filter may use summation of one or more observed signals and reference signals, along with delay and feedback to process sampled data to compensate for noise, error and uncertainty. In one configuration, the adaptive module 311 may use the received composite GNSS signal 309 (e.g., error signal) for an epoch as an input as follows:

$$e(k) = _{WB}(k) + PN(k) + n(k), \text{ where:} \qquad \text{Equation 3}$$

e(k) is the filtered composite GNSS signal (e.g., error signal) for corresponding epoch k, PN is the pseudo-random noise code for corresponding PN(k) is the GNSS pseudorandom sequence (e.g., code modulating a GNSS carrier signal) during the corresponding epoch k, n(k) is the thermal noise disturbance during the corresponding epoch k.

The filtered composite GNSS signal for corresponding epoch k, if being absent from the WBI, is usually small and noise like (zero mean). Therefore, over a long period, the expected mean of the tap vector signal 313 maintains a constant target value.

However, the unpredictable disturbances, such as the WBI and the blanking function illustrated in FIG. 5, will negatively impact the stability and performance of the notch filter 306. For example, if the notch filter 306 operates or settles at steady state mode, at the second epoch (e.g., T2 epoch), the blanking and NF control module 213 detects the overflow saturation and blanks the sample; the signal (116, 136) is reset to "0" or a predetermined value consistent with elimination or attenuation of the pulse-like WBI. Further, after the blanking of the NF control module 213, the local predicted NBI signal is $J_{NB}(k) = A_{NB} e^{j\omega_0 k}$, where the resultant filtered composite GNSS signal 309 becomes as follows:

$$e(k) = -J_{NB}(k), \qquad \text{Equation 4}$$

e(k) is the filtered composite GNSS signal (e.g., error signal) for corresponding epoch k, and $J_{NB}(k)$ is the narrowband interference signal (301) during the corresponding epoch k.

Compared with Equation 3, in Equation 4 the filtered composite GNSS signal 309 (e.g., error signal) is generally larger if there exists the estimation of NBI, which can bias or distort the proper operation of the adaptive module 311. In Equation 4, the larger filter composite GNSS signal 309 (e.g., generally larger error signal), at the second epoch, tends to distort the tap vector signal 313 and make the local NBI prediction 314 for the third epoch inaccurate. Accordingly, the inaccuracy can lead to the filtered composite GNSS signal 309 (e.g., error signal) that is large for the third epoch, and further bias the tap vector signal 313.

In conjunction with FIG. 5, the distortion process described in the preceding paragraph can lead to one or more of the following items: (1) that the tap vector signal 313 oscillates due to the large update error in filtered composite GNSS signal 309; hence, results in the potential divergence of the notch filter 306 from an accurate prediction of notch frequency and depth for accurate filter coefficients of one or more digital notch filters; (2) that the filtered composite GNSS signal 309 (e.g., error signal) has large un-compensated NBI component, if not causing loss of lock on the carrier phase of the received GNSS signal arising from a phase discontinuity (e.g., phase jump) in the filtered composite GNSS signal 309, at least degrades the GNSS tracking performance of the carrier phase tracking loop, and/or code phase tracking loop.

Further, besides the phase discontinuity introduced by the blanking sequence, bk(k), the undetected WBI (not being blanked) can cause the degradation of the tracking performance and potential oscillation of the notch filter convergence as well.

FIG. 6 is a block diagram of one embodiment of filter system that incorporates an adaptive narrowband interference rejection and wide-band interference rejection based on environmental perception of the interfering signal with respect to the received signal. The system of FIG. 5 builds or adds to the system of FIG. 6. Like reference numbers in FIG. 5 and FIG. 6, or in any set of two or more drawings indicate like features, elements, steps or methods.

The balking and control module 213 receives NBI signal 301 and the pseudorandom noise code and noise 302 as an input to a first summer 413 to yield a first error signal. The first error signal 303 and the WBI are inputted into an optional second summer 417 that yields a second error signal (e.g., or signals) for application to digital GNSS band selective filtering (144, 154). To avoid the negative impact resulting from the detectable WBI, where phase discontinuity is introduced by the blanking and notch filter (NF) control module 213, FIG. 6 further comprises a control module to the processing system of FIG. 5. Compared with the system of FIG. 5, in FIG. 6 a notch filter control module 410 is used to generate a decision vector signal 402 which includes the notch filter order signal 415, the tap vector disable signal 425, and the notch filter memory reset signal 435. The notch filter control module 410 comprises two critical components: (1) a wideband fast Fourier Transform (FFT) spectrum analyzer and (2) a bank of GNSS band peak pattern identifiers.

In FIG. 6 in the NF control module 410, the wideband FFT spectrum analyzer uses the baseband signal (113, 133), which outputted by the ADCs (112, 132) to generate a frequency spectrum; each peak identifier is programmed for a specific GNSS band (e.g., L1 band or L2 band for GPS) using the vector index signal 411 (e.g., location signal vector) and a GNSS shaping filter signal 412 (e.g., shaping correction signal).

The notch filter control module 410, combined with the apparatus gated reset signal 214 (e.g., blanking sequence) from the blanking and NF control module 213, decides the optimal configuration of the notch filter (306, 110, 130) through filter order signal 415, tap vector update disable signal 425, and the notch filter memory reset signal 435.

In one embodiment, the adaptive module 311 provides feedback to adjust the notch filter 306. The adaptive module 311 receives filter order signal 415, tap vector update disable signal 425, and the notch filter memory reset signal 435 and the composite GNSS signal 309 (e.g., with error, pseudorandom noise code and noise components) and outputs error signal 312 (e.g., feedback) to the notch filter 306. The output signal 307 of the notch filter 306 and the tap vector signal 313 are provided to multiplier 421 (e.g., mixer) and to yield in input to third summer 308. Further, summer 308 adds to the output of the digital GNSS band selective filtering (144, 154) to the output of the multiplier 421 to produce the composite GNSS signal 309, which is notch filtered, as an input to multiplexer 406. The multiplexer 406 can select the resultant signal 407 that contains one or more of the following: (a) the notched filtered signal of the composite GNSS signal 309, or (b) the un-notched output of the digital GNSS band selective filtering (144, 154). In an alternate embodiment, the multiplexer 406 can select the resultant signal 407 that includes digital components (e.g., weighted components) of both the notched filtered signal of the composite GNSS signal and the un-notched filtered signal.

The notch filter control module 410 decides when to include the notch filter process by controlling an enable signal 404 (e.g., ON/OFF signal, a selection signal, or both) to the multiplexer 406 (e.g., MUX 406). The resultant signal 407 is expected to mitigate the NBI as well as to minimize the distortion that is potentially otherwise caused by blanking or filtering of the WBI component.

Figure 7:
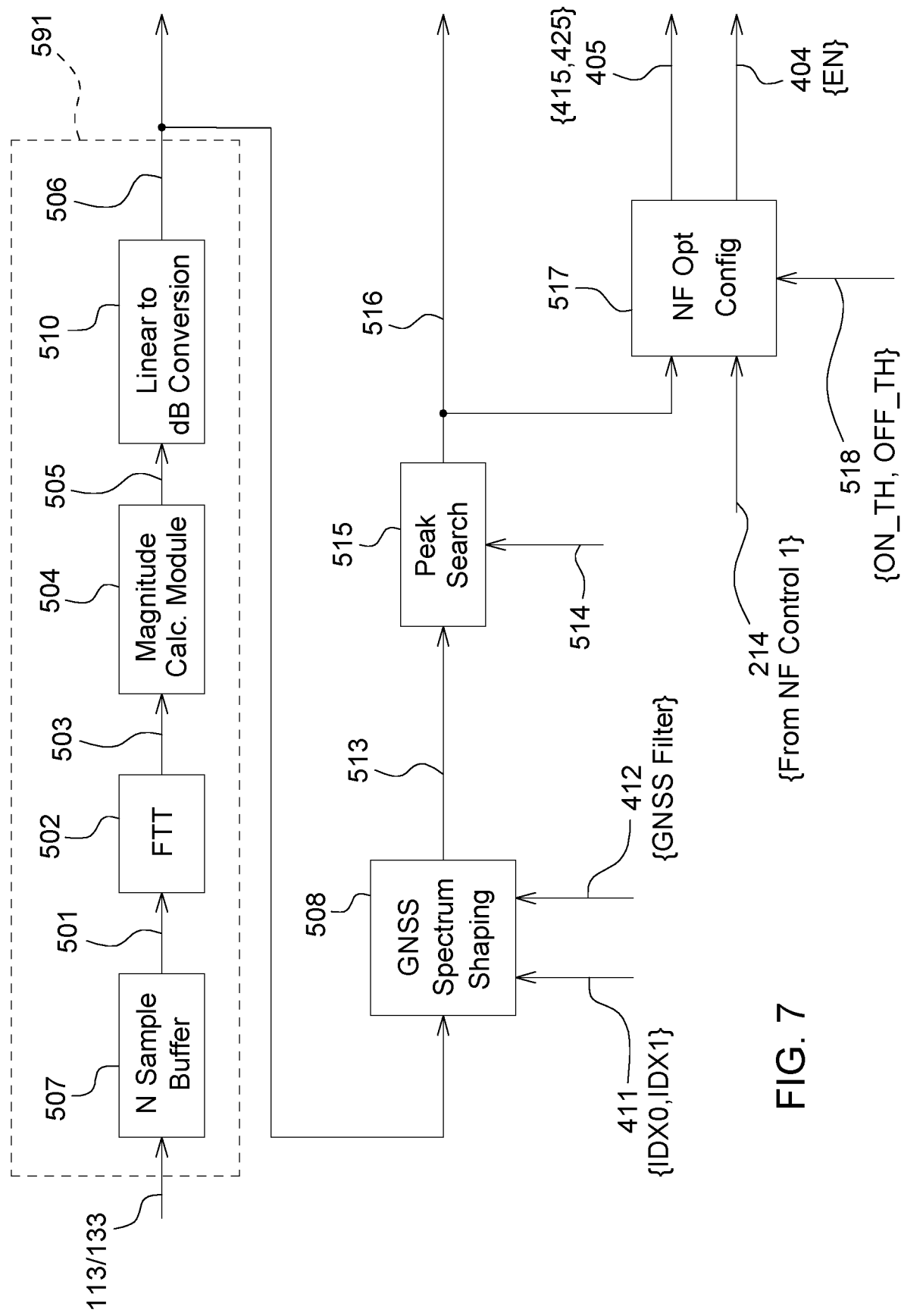
FIG. 7 is a block diagram of one embodiment of filter system that controls adaptive narrowband interference rejection and wide-band interference rejection based on a spectrum analyzer observing the interfering signal with respect to the received signal (e.g., radio environment perception).

FIG. 7 is a block diagram of one embodiment of notch filter control module 410 that controls adaptive narrowband interference rejection and wide-band interference rejection based on a spectrum analyzer observing the interfering signal with respect to the received signal (e.g., radio environment perception). The filter system of FIG. 7 and its associated components are discussed in conjunction with FIG. 8 through 10, inclusive.

Figures 11A, 11B:
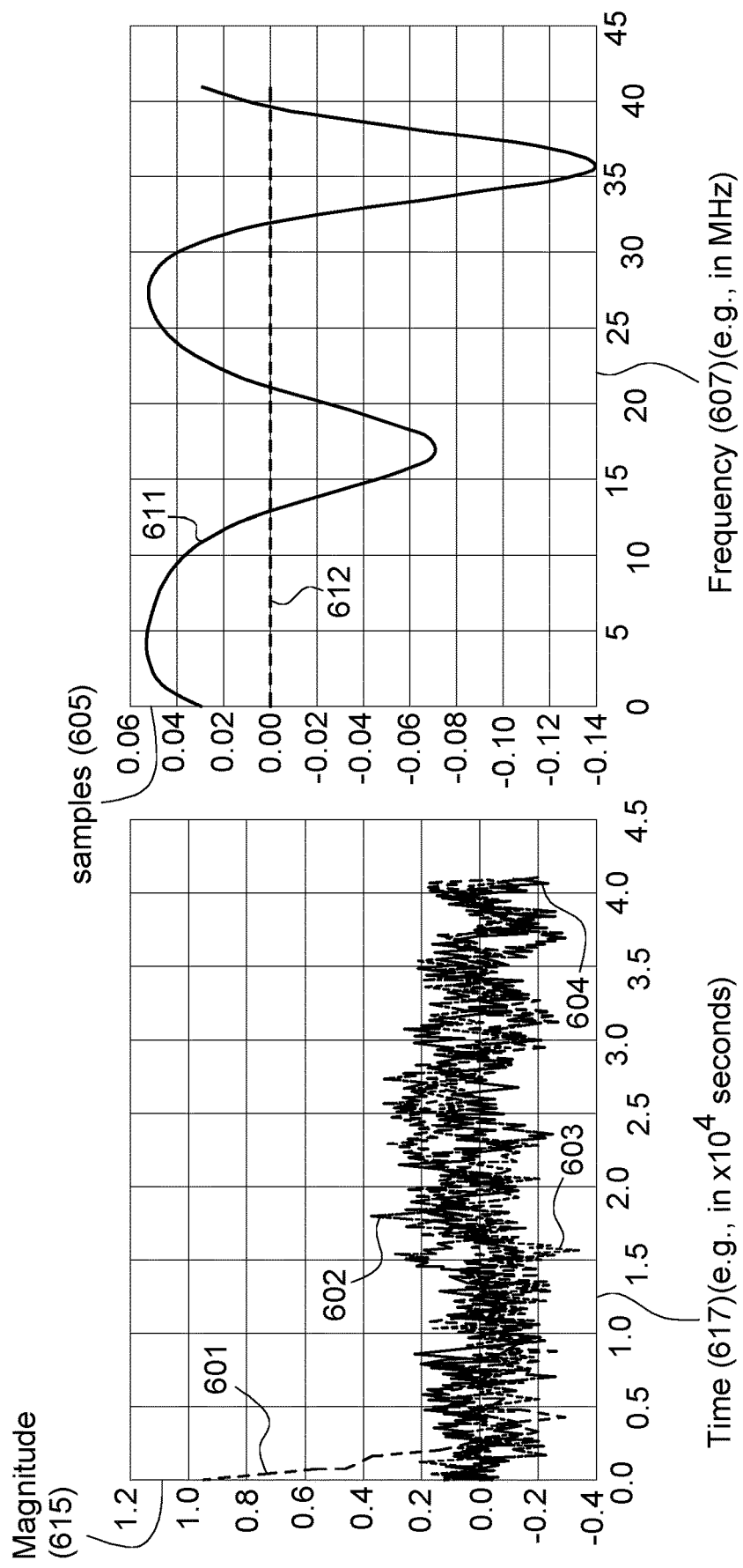
FIG. 11A is an illustrative graph of the magnitude for various filter coefficients of a notch filter versus time (e.g., number of sampling intervals) in a noise only environment, such an interfering signal.
FIG. 11B is an illustrative graph of samples versus frequency for a filter that illustrates group delay or phase distortion versus frequency.

FIG. 11, which includes FIG. 11A and FIG. 11B, provides illustrative graphs of the performance degradation associated with a notch filter in a noise only situation. Separately, FIG. 12, which includes FIG. 12A and FIG. 12B, provides illustrative graphs of the performance degradation arising from a mismatch of the notch filter configuration and radio reception conditions. To the extent possible, the design of the notch filter n FIG. 7 through FIG. 10, inclusive, can be configured to address the in the situation and reception conditions set forth in FIG. 11 and FIG. 12.

In FIG. 7, the notch filter control module 410 comprises a wideband FFT spectrum analyzer 591 and peak identifier module 515 (e.g., capable of identifying multiple peaks), where each peak identifier module 515 is configured for a specific GNSS band. For example, the FFT spectrum analyzer 591 comprises a sample memory unit 507 (e.g. N sample buffer), a FFT butterfly propagation module 502 (e.g. N FFT module), a magnitude calculation module 504 and a linear-to-dB conversion module 510. In one embodiment, the wideband digital baseband signals (113, 133) (e.g., as data samples) are stored in the memory unit 507 in a complex number format, including the in-phase component and the quadrature-phase component. The number of samples (N) is typically designed or configured as $2^M$ to facilitate the butterfly propagation, where the data processor determines or selects M by evaluating (e.g., balancing) one or more of the following factors: the frequency resolution, detection sensitivity to the NBI, and the calculation complexity.

The memory unit 507 outputs a vector complex signal 501, which is processed by the N-sample FFT module 502. The N-sample FFT module 502 outputs a complex vector 503 (e.g., complex output vector), which represents the frequency spectrum density of the input digital baseband signal (113, 133), based on the inputted vector complex signal.

The magnitude unit 504 extracts the amplitude or power information from the complex vector 503. The magnitude unit 504 may comprise a lowpass filter, where the lowpass filter averages the N-samples of FFT amplitude over multiple FFT periods to further reduce the noise.

In order to simplify the translation from wideband FFT spectrum to each specific GNSS band spectrum and facilitate the peak search, the linear to decibel (dB) conversion module 510 converts the linear spectrum magnitude into a decibel magnitude scale (e.g., specific logarithmic scale) or another logarithmic scale. In one embodiment, the output spectrum signal 506 (e.g., resultant signal) in decibels (dB) or another logarithmic sale is fed into a GNSS filter or GNSS spectrum shaping module 508 to normalize, scale, compress or adjust the output spectrum signal. The spectrum signal 513 (e.g., output spectrum signal) of the GNSS spectrum shaping module 508 or the spectrum signal 513 of one or more GNSS band peak identifiers, such as the peak identifier module 515 (e.g., peak search module).

In the GNSS band or sub-band, a typical wideband spectrum can represent a bandwidth of 100-130 Megahertz (MHz) using a sampling frequency at approximately 300 MHz. For example, an aggregated wideband can typically include GPS L1, GLONASS G1, and BeiDou B1 in a single GNSS receiver. The GNSS band selective filtering module (144, 154), such as the first sub-band filer 114 and the second sub-band filter 134, is used to extract a specific individual GNSS band from the wideband digital baseband signal (113, 133). Therefore, an individual GNSS band spectrum or sub-band spectrum can be reconstructed using the corresponding section of the wideband, output spectrum signal 506 with a GNSS shaping correction (of frequency versus magnitude) by the GNSS spectrum shaping for each corresponding GNSS band or GNSS sub-band. The section of a GNSS band on the wideband, digital baseband signal spectrum (113, 133) is denoted by a vector index signal 411 {IDX0, IDX1}, where IDX0 is the low index to the fast Fourier transform (FFT) output spectrum signal 506, and IDX1 is the high index to the output spectrum signal 506 (e.g., which can be expressed as a FFT vector signal). In one embodiment, the shaping filter signal 412 represents the GNSS band selective filter shape from selective filtering module (144, 154) such as the first sub-band filer 114 and the second sub-band filter 134. The GNSS spectrum shaping module 508 generates the spectrum signal 513 for a specific corresponding GNSS band.

The frequency content of spectrum signal 513 of a specific corresponding GNSS band or GNSS sub-band is inputted to one or more peak identifier modules 515. For a specific corresponding GNSS band or sub-band, each of the peak identifier modules 515 counts the number of the peaks in the spectrum signal 513 that are above a predefined threshold. The peak identifier module 515 relies on the separation signal 514 to correctly sort and order (rank) the highest N peaks, where the Nis determined by the maximum number of interferences that the notch filter (110, 130) (e.g., cascaded notch filter) can reject simultaneously, and the separation signal 514 on the frequency spectrum avoids counting multiple large points that belong to a single peak. The output signal 516 (e.g., output peak signal) comprises N highest peaks in dB and the noise floor calculated by each respective peak identifier module 515.

Using the vector signal 516 (e.g., output peak signal), the apparatus gated reset signal 214, and an ordered pair signal 518 {OnTh, OffTh}, the notch filter configuration module 517 optimizes the settings for the notch filter (110, 130) such as order of the filter order signal 415, the tap vector update disable signal 425, the memory reset signal 435, and the notch filter enable signal 404. The dual threshold signal 518 or hysteresis signal used to prevent the frequent transition among different configurations and between applying and not using the notch filter (110, 130) (e.g., to avoid phase discontinuities in the received filtered GNSS signal, or the PN component thereof).

Each peak identifier module 515 may operate in accordance with software instructions or a rule-set of if-then statements, such as any of the following: (a) If a peak against the noise floor exceeds the OnTh, the peak is accommodated and the order of the notch filter increments by 1; (b) if the peak against the noise floor is below the OffTh, the peak is not counted and does NOT make order increment; and (c) if the peak against the noise floor is between the OffTh and OnTh, the peak is counted if it was counted before, otherwise not counted if it wasn't counted. Further technical details about the peak identifier module 515 will be discussed later in this document.

In FIG. 7, a linear-to-dB conversion module 510 facilitates (e.g., simplifies) the individual GNSS band spectrum shaping by the GNSS band spectrum shaping module 508 and peak search and peak identification process by the peak identifier module 515. Within the linear to dB conversion module 510, the linear magnitude to dB conversion can be modeled in accordance with the following equation:

$$Db = 20 \log_{10} A, \text{ where} \qquad \text{Equation 5}$$

Db denotes the spectrum power in dB,
A represents the spectrum magnitude in square root of average power (e.g., in the frequency domain).

Because of the nonlinear function of log( ), the linear to dB conversion module 510 may use a look-up table (LUT) rather than determining the conversion in accordance with the above equation. However, the large dynamic range in the magnitude domain requires a large memory size to store each log value. For example, if the magnitude ranges from 0 to 65535, it requires a memory size of 64 KB (e.g., Kilobits or Kilobytes). However, if the log curve is compressed (e.g., severely compressed), the 3 dB increment means a single step (from 1 to 2) or ten thousand steps (from 10,000 to 20,000). Therefore, in one embodiment, the linear to dB conversion module 510 may use an innovative, general log implementation using Taylor expansion plus a limited size of LUT, as described in more detail below.

Figure 8:
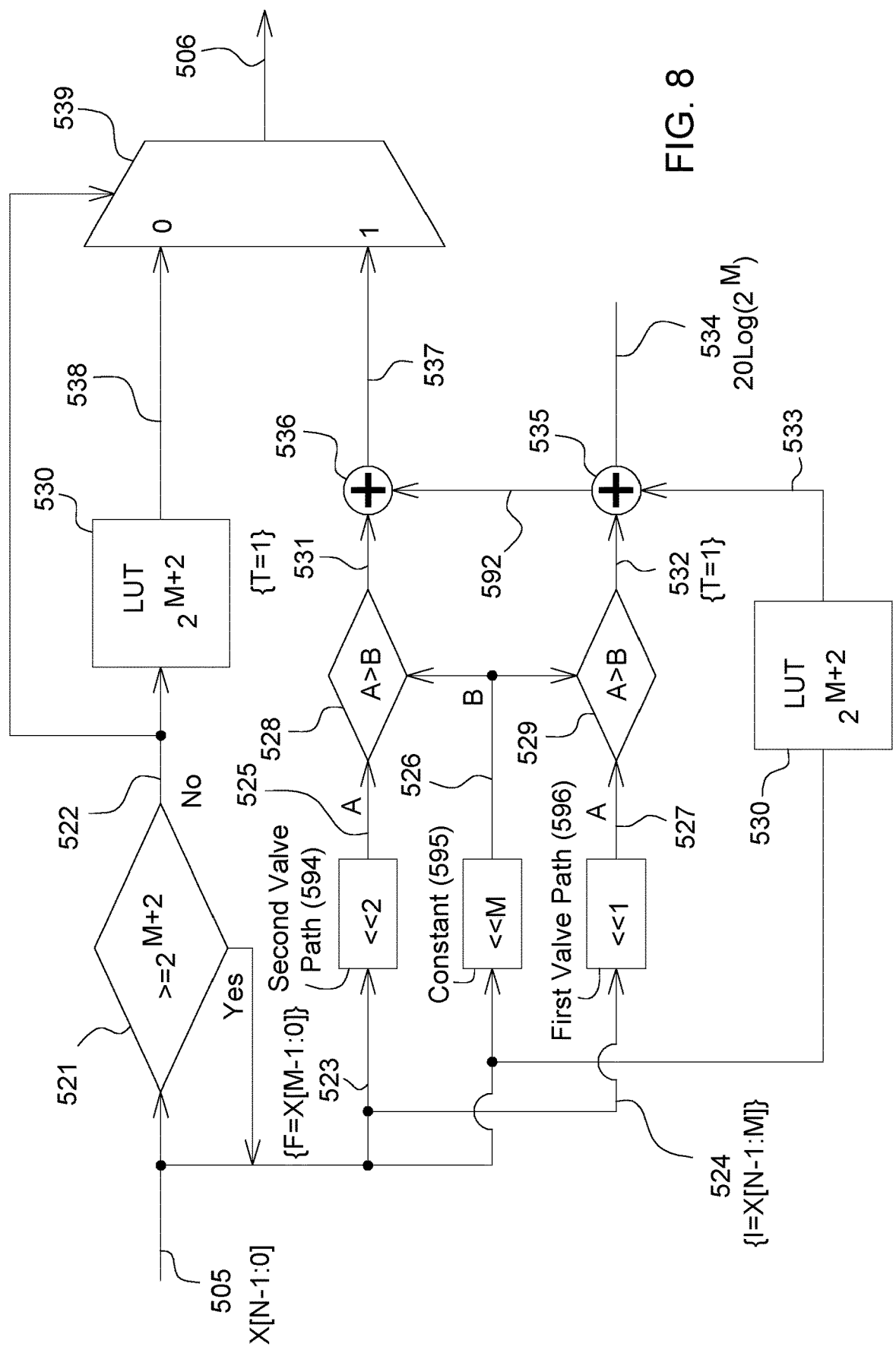
FIG. 8 is a block diagram of one embodiment of a filter system that controls interference rejection based on a frequency versus magnitude response from a spectrum analyzer that does a linear-to-log conversion (e.g., by applying an iterative Taylor expansion series and a look-up table (LUT).

FIG. 8 is a block diagram of one embodiment of a filter system that controls interference rejection based on a frequency versus magnitude response from a spectrum analyzer that does a linear-to-log conversion (e.g., by applying an iterative Taylor expansion series and a look-up table (LUT). FIG. 8 is an implementation of the linear to decibel conversion represented by Equation 5. Before discussing the detailed implementation, a theoretical derivation and practical approximation using Taylor expansion will be introduced first. The Equation 5, assuming the magnitude is an N bit integer, can be rewritten as follows:

$$Db = \frac{20}{\ln 10} \ln(I \cdot 2^M + F), \qquad \text{Equation 6}$$

where
F is an integer within range $[0, 2^M - 1]$,
I is the higher bit section ranging $[0, 2^{N-M} - 1]$, and
ln( ) is a natural log function which has a simpler Taylor expansion.

In order to apply Taylor expansion, the Equation 6 needs to be decomposed into multiple terms as set forth in the following equation:

$$\begin{aligned} Db &= \frac{20}{\ln 10} \ln(I \cdot 2^M + F), & \text{Equation 7} \\ &= \frac{20}{\ln 10} \left[ \ln(I \cdot 2^M) + \ln\left(1 + \frac{F}{I \cdot 2^M}\right) \right] \\ &= \frac{20}{\ln 10} \left[ M \ln(2) + \ln(I) + \ln\left(1 + \frac{F}{I \cdot 2^M}\right) \right], \end{aligned}$$

where
Mln(2) is a constant,
I is an N-M bit integer, and $$\ln\left(1 + \frac{F}{I \cdot 2^M}\right)$$

can be further expanded using Taylor expansion.

The Taylor expansion of $\ln(1+F/I\cdot 2^M)$ in the Equation 7 can be explained in conjunction with the following equation:

$$\ln\left(1+\frac{F}{I\cdot 2^M}\right) = \frac{F}{I\cdot 2^M} - \frac{1}{2}\left(\frac{F}{I\cdot 2^M}\right)^2 + O\left\{\left(\frac{F}{I\cdot 2^M}\right)^3\right\}, \quad \text{Equation 8}$$

where $O(\ )$ is the sum of the $3^{rd}$ and higher order terms,

In order to minimize the error and able to apply the linear approximation to the Taylor expansion, it is reasonable to require the following:

$$\frac{F}{I\cdot 2^M} \leq \frac{1}{4}, \quad \text{Equation 9}$$

and therefore the upper bound of the second and higher order truncation becomes:

$$\frac{1}{2}\left(\frac{F}{I\cdot 2^M}\right)^2 - O\left\{\left(\frac{F}{I\cdot 2^M}\right)^3\right\} < \quad \text{Equation 10}$$

$$\frac{1}{2}\left(\frac{F}{I\cdot 2^M}\right)^2\left\{1+\frac{F}{I\cdot 2^M}+\left(\frac{F}{I\cdot 2^M}\right)^2+\ldots\right\} \leq \frac{1}{2}\left(\frac{1}{4}\right)^2\frac{4}{3} = \frac{1}{24}$$

To satisfy the condition denoted by Equation 9, based on the Equation 6 that F is in range $[0, 2^M-1]$, it requires $I>=4$, i.e. the look-up table (LUT) needs to have $2^{M+2}$ entries. As a result, the following equation is derived to support the LUT with the Taylor series expansion:

$$Db = \begin{cases} \text{using } LUT \text{ if } I\cdot 2^M + F < 2^{M+2} \\ 6M + 20\log(I) + \left(\frac{8.68}{I}\right)\frac{F}{2^M} \end{cases}, \quad \text{Equation 11}$$

where 6M is a constant, $$\frac{F}{2^M} < 1, \text{ and}$$

$$\frac{8.68F}{2^M I} = \sum_{k=1}^{2}\{8\cdot 2^{-k}F \geq (2^M I)\}, \{8\cdot 2^{-k}F \geq (2^M I)\}$$

is logic assertion which is "1" if the condition is true, otherwise equal to "0".

With respect to the term $\ln(I)$ in Equation 7, if I is less than the $2^{M+2}$, the decibel value can be simply solved by the LUT. Otherwise, the linear to decibel conversion module 510 can iteratively apply the approach discussed in Equation 6 to Equation 11 to determine the decibel value, consistent with the following estimation of I:

$$\ln(I)=\ln(I_1\cdot 2^M+I_2) \text{ until it approaches } I_1<2^{M+2}. \quad \text{Equation 12}$$

FIG. 8 is a block diagram of one embodiment of a filter system that controls interference rejection based on a frequency versus magnitude response from a spectrum analyzer with a linear to decibel conversion module 510 that does a linear-to-log conversion (e.g., by applying an iterative Taylor expansion series and a look-up table (LUT). FIG. 8 illustrates the realization of the theoretical analysis addressed by the foregoing paragraphs of this document.

In the example of FIG. 8 to simplify the block diagram of the linear to decibel conversion module 510, it is assumed that $I\leq 2^{M+2}$ so that the iterative application of Equation 6 through Equation 11, inclusive, is not required and is not shown. However, in practice it is understood that other configurations of the linear to decibel conversion module 510 may use logic or software instructions that support iterative application, and associated solution, of Equations 6 through 11, inclusive.

In FIG. 8, the linear to decibel conversion module 510 is illustrated in greater detail, where N and M are positive integer values. The magnitude module 504 of FIG. 7 provides the input signal 505 [X[N−1:0] (e.g., linear magnitude input signal) to the linear to decibel conversion module 510 as an N-bit integer.

The decision module 521 determines whether the input signal 505 (e.g., linear magnitude input signal) is greater than or equal to a threshold, where the threshold can be set to $2^{M+2}$, where M or the natural log, base 2 of M is a constant. If the decision module 521 determines that the input signal 505 is less than (e.g., not equal to or greater than) the threshold (e.g., threshold $2^{M+2}$), the linear to decibel conversion module 510 uses the first look-up table (LUT) 530 to generate the linear-to-decibel conversion. However, if (the decision module 521 determines that) the input signal 505 (e.g., linear magnitude input signal) is greater than or equal to the threshold (e.g., threshold $2^{M+2}$), the linear to decibel conversion module 510 continues with modules that evaluate components of the input signal 505 (e.g., linear magnitude input signal).

If the input signal 505 is applied to the first LUT 530 and the first LUT 530 is used consistent with decision module 521, the first LUT 530 is used to complete the conversion and to select the result signal 538 if the input signal 505 is within a range of the first LUT 530.

Otherwise, or if (the decision module 521 determines that) the input signal 505 is greater than or equal to the threshold (e.g., where the threshold can be set to $2^{M+2}$), the input signal 505 is divided into components as: (1) a M bit integer F (signal 523) and (2) a higher N−M bit integer I (signal 524).

The higher N−M bit integer I (signal 524) in inputted to a second look-up table (LUT) 590. If the signal 524 is within the range of the second LUT 590, the second LUT 590 completes the conversion of 20 log(I) and results in the output signal 533, which is applied to first summer 535. The first summer 535 outputs the sum of the output signal 533 and output signal 532 that is derived from the M bit integer F (signal 523), or (2) a higher N−M bit integer I (signal 524), or both. As illustrated in FIG. 8, the signal 534 is the constant signal 20 log($2^M$) or 6M.

A first comparator 529 compares signal 526 (e.g., $2^M$I) from constant path 595, at comparator terminal B, with the first threshold 2F (signal 527), at comparator terminal A from first value path 596. The first comparator 529 may generate a logic level signal 532, such as high level logic signal (T=1), if the input signal 527 at comparator terminal A is greater than the input signal 526 at comparator terminal B. The first summer 535 sums the logic level signal 532, signal 533 and 20 log(2M) signal 534 to yield sum signal 592.

A second comparator 528 compares signal 526, at comparator terminal B, with the second threshold 4F (signal 525), at comparator terminal A from the second value path 594, using to obtain the approximation of $$\left(\frac{8.68}{I}\right)\frac{F}{2^M}$$

in Equation 11. The second comparator 528 may generate a logic level signal 531, such as high level logic signal (T=1), if the input signal 525 at comparator terminal A is greater than the input signal 526 at comparator terminal B. The second summer 536 sums the logic level signal 531 and signal 592 to yield sum signal 537.

As noted above, the second LUT 590 completes the conversion of 20 log(I) and results in the output signal 533, which is applied to first summer 535. The first summer 535 outputs the sum of the output signal 533, the output signal 532 that is derived from the M bit integer F (signal 523), and 20 log(2M) signal 534. As illustrated in FIG. 8, the signal 534 is the constant signal 20 log($2^M$) or 6M. The 20 log(I) signal 533, 20 log(2M) signal 534 and the correction signal 531 and 532 are summed together to achieve the log conversion if the input signal 505 exceeds the LUT range of the first LUT 530.

The multiplexer 539 is configured with logic of the linear to decibel conversion module 510 (or the electronic data processor) to provide the resultant signal as the output of the first LUT 530 or the result of the second LUT 590 in combination with the evaluations of signal components (e.g., divided signal components 523, 524) by the first comparator 529 and the second comparator 528. The output spectrum signal 506 (e.g., resultant signal) in decibels dB is used by each peak identifier modules 515 of each respective GNSS band or sub-band to identify the peaks in amplitude or magnitude of the received GNSS signal.

FIG. 9 includes FIG. 9A and FIG. 9B. FIG. 9A is a block diagram of one embodiment of a wide-band spectrum analyzer that comprises one or more peak identifier modules 515 that identify a peak pattern from the magnitude 593 versus frequency 597 (e.g., frequency spectrum) for each GNSS band. In FIG. 9, the GNSS spectrum shaping module 508 (of FIG. 7) provides a specific GNSS sub-band spectrum or GNSS band spectrum signal 513 (e.g., spectrum vector signal) as input to a respective peak identifier 515 associated with the same GNSS sub-band or GNSS band.

The peak identifier module 515 may comprise a merge-sort unit 551 that sorts the inputted GNSS sub-band spectrum or GNSS band spectrum signal 513. In one embodiment, the merge-sort unit 551 outputs a vector signal (552, 560), which is a resulting signal sorted in descending order and in format of {Magnitude, IDX}, where the Magnitude is the power in dB to each fast Fourier transform (FFT) bin and IDX is the index associated with the corresponding magnitude in the spectrum signal 513 (e.g., vector signal).

In FIG. 9, the modules other than the merge-sort module 551 (e.g., merge-sort unit), individually and collectively, are configured to identify up to N or N valid peaks from the vector signal (552, 560). Each peak identifier module 515 may use a frequency separation parameter for a peak discrimination process, which is important to prevent the peak identifier module 515 from counting (e.g. overcounting) multiple peak points that actually belong to the same peak. The peak discrimination process can be explained by an illustrative example, where without loss of generality, such as where two peaks are identified by comparators (555, 556). In particular, the peak discrimination process of the peak identifier module 515 accurately identifies two (N=2) peaks by using the two comparators 555 and 556 and one delay unit (D) 557. However, more generally, an N peak extraction uses N comparators and N−1 delay units.

Here, as illustrated in FIG. 9B in the waveform 579, the received GNSS frequency spectrum is bimodal or dual modal frequency 587 versus magnitude 593 distribution. FIG. 9B is further defined by Table 3 in which the first column is an index to the peak points on the waveform 579 of FIG. 9B; the second column is the reference number label of those peak points in FIG. 9B; the third column is the sort index to the sorted vector signal (552, 560); the fourth column is the sorted results signal 552 in format of {Magnitude, IDX in original waveform}; the fifth column listed the extracted peak after the whole iteration.

In one example, before the peak identification or peak extraction, the separation signal 514 is set to a threshold (Th) (e.g., 4) to be applied to the first comparator 555 and the second comparator 556; at the output of the D-type flip-flop or D-type latch, the signal 554 is set to a first reference value (e.g., −5); and the signal 560 is set to a second reference value (e.g., −5). When enabled at the enable terminal, the D-type latch can be configured to transfer the logic value at the D input terminal to the Q output terminal and to hold the transferred logic value until the next clock pulse.

The first comparator 555 compares the difference between the index value (which is associated with the corresponding magnitude in vector signal (552, 660) and based on spectrum signal 513) and the first reference or the threshold (Th) to provide an indicative logic output signal 559 to comparator output terminal of the first comparator 555. If the difference is greater than the threshold, the first comparator 555 provides the indicative logic output signal 559 (e.g., true or high logic level) to the comparator output terminal. However, if the difference is not greater than the threshold, the first comparator 555 provides the opposite logic output (e.g., false or a low logic level), which is opposite to the indicative logic output signal 559, to comparator output terminal.

The second comparator 556 compares the difference between the index value and the second reference of the threshold (Th) to provide an indicative logic output signal 561 (e.g., true or high logic level) to the comparator output terminal of the second comparator 556. If the difference is greater than the threshold, the second comparator 556 provides an indicative logic output signal 561 to the comparator output terminal. However, if the difference is not greater than the threshold, the second comparator 556 provides the opposite logic output (e.g., false or a low logic level), which is opposite to the indicative logic output signal 561, to comparator output terminal.

The spectrum signal 513 (e.g., input signal inputted into peak identifier module 515 or peak search module) has two peaks at difference center frequencies as illustrated in the waveform 579 of FIG. 9B. The N peak memory module 515 receives the signals (552, 566), where N peak memory module 566 may update the index associated with a corresponding magnitude of a signal 552. To the extent provided by the merge-sort module 551, the peak identifier module 515, or electronic data processor, begins by accessing the zero element (of the sort index) in the inputted spectrum signal (513, 553) to yield output signal 516 (e.g., output peak signal) and next accesses the next element (of the sort index, e.g., first element of the sort index); and so on iteratively.

For the zero element of the sort index, the merge-sort module 551 sets signal 560 to an index value 5, (where the index is associated with peak point 570 in FIG. 9B). The index value (5) of the peak point 570 is subtracted from first reference signal 554 (−5) or the second reference signal 558

(−5) to yield a difference of 10. Further, in the example the difference (10) is greater than the threshold (4) (i.e., 10>4).

TABLE 3

Example for Peak Identification

| Index | Peak Signal | Sort Index | Sorted Descending Ord | Extracted Peak |
|---|---|---|---|---|
| 5 | 570 | 0 | {570, 6} | {570, 6} |
| 6 | 571 | 1 | {572, 7} | |
| 7 | 572 | 2 | {571, 5} | |
| 14 | 573 | 3 | {574, 15} | {574, 15} |
| 15 | 574 | 4 | {573, 8} | |
| 16 | 575 | 5 | {575, 16} | |
| 17 | 576 | 6 | {576, 17} | |

In FIG. 9A and FIG. 9B can be described in conjunction with above Table 3. In FIG. 9A, if the peak identifier module 515 determines that both signal 561 and 559 are true (e.g., or high logic level), then the AND gate (1) makes the signal 563 true, (2) makes the index counter 564 increment (e.g., increment 5 by one to yield an incremented or updated index (565) of 6 in the last column of Table 3), (3) stores the peak signal {570} (e.g., peak signal magnitude) in the $0^{th}$ location (sort index) of the memory block or N peak memory module 566 (e.g., with the associated incremented/updated index (or 6, for example) of the index counter), (4) pushes the signal 554 into 558 through delay unit (D) 557, and (5) updates the signal 554 with 6 (the updated or incremented index to peak point 570 in the waveform 579).

In second example of executing the block diagram of FIG. 9A with different input signals or input states, peak identifier module 515, or the data processor, accesses the first element (of sort index) of vector signal (552, 560) and sets the signal 560 to index value 6. The first comparator 555 compares a difference of the index value (6) of signal 560 and first reference value 554 (e.g., 6) to the threshold (e.g., 4); therefore the output signal 559 is false. Although the second comparator 556 determines that difference of signal 560 (with an index value of 6) and the signal 558 (with the second reference value (−5)) is 11, where signal 561 is true, the output of the AND gate 562 remains false at signal 563. Therefore, the first element (element 1 of the sort index) does not represent a peak at point 571 on the waveform 579 of FIG. 9B, which is consistent the waveform 579. Further, in waveform 579 it is obvious that points 571, 570, 572 and 573 form a single peak shape with the maximum power or magnitude of the peak noted by point 570. Similarly, points 575, 574 and 576 form a single peak shape with the maximum power or magnitude noted by point 574.

In third example of executing the block diagram of FIG. 9A with different input signals or input states, peak identifier module 515, or the data processor, accesses the second element (of sort index) of vector signal (552, 560) and sets the signal 560 to index value 7. The first comparator 555 compares a difference of the index value (7) of signal 560 and the first reference value 554 (e.g., 6) to the threshold (e.g., 4); therefore the output signal 559 is false. Although the second comparator 556 may determine that difference of signal 560 (with an index value of 7) and the signal 558 (with the second reference value (−5, if the period of clock cycles of the delay, for delay unit 557, equal to or greater than two and 6 if the clock period is one cycle delay), is 12, where signal 561 is true, the output of the AND gate 562 remains false at signal 563. Therefore, the second element (element 2 of the sort index) does not represent a peak at point 572 on the waveform 579 of FIG. 9B, which is consistent the waveform 579.

In fourth example of executing the block diagram of FIG. 9A with different input signals or input states, peak identifier module 515, or the data processor, accesses the third element (of sort index) of vector signal (552, 560) and sets the signal 560 to index value 14. The first comparator 555 compares a difference of the index value (14) of signal 560 and the first reference value 554 (e.g., 7) to the threshold (e.g., 4); therefore the output signal 559 is true. The second comparator 555 compares a difference of the index value (14) of signal 560 and the second reference value 554 (e.g., 6) to the threshold (e.g., 4); therefore the output signal 561 is true. Therefore, the third element (element 3 of the sort index) does represent a peak at point 574 on the waveform 579 of FIG. 9B.

The peak identifier module 515, or the data processor, accesses the third element of the vector signal (552, 560) and sets the signal 560 to index 14. The index 14 exceeds both the signal 554 (e.g., 6 or 7) and the signal 558 (e.g., 6 or −5) by at least 4 and thus (1) makes the signal 563 true, (2) makes counter 564 increment by one (e.g. index 14 is updated, incremented to index 15), (3) stores the peak signal {574} in the first location of the memory block 566 (e.g., along with the updated, incremented index, 15), (4) updates the signal 560 with an update value (e.g., of 6 or 7), (5) updates the signal 554 with the updated incremented index (e.g., 15) the index to peak point 574 in the waveform 579).

After the whole iteration process as discussed in conjunction with FIG. 9A, FIG. 9B and Table 3, the peak identifier module 515 correctly extracts the peaks from the multi-modal spectrum waveform and lists them in the vector signal 516.

FIG. 10 represents an illustration of a state diagram for a notch filter control module 410 (e.g., notch filter controller) in FIG. 6 (e.g., electronic data processor) that controls hysteresis enable and disable of an adaptive narrowband notch filter. The notch filter control module 410 (e.g., notch filter controller) can control the first NB rejection system 110 and the second NB rejection system 130 to apply the hysteresis control to prevent the frequent change in the notch filter order and/or frequently switching on and off of the enable signal 404.

FIG. 10 illustrates the proposed method of operating the notch filter control module 410 (e.g., notch filter controller), where the horizontal axis (x-axis) 580 represents the metric of signal-to-noise ratio (SNR) and the vertical axis (y-axis) represents the activation or deactivation of the notch filter, or the filter order (e.g., one stage filter to filter a signal notch or multi-stage cascaded filter to filter multiple corresponding notches) such as the first NB rejection system 110 and the second NB rejection system 130.

In FIG. 10, initially, the hysteresis control of the notch filter control module 410 will be set to zero order, and the enable signal 404 in FIG. 6 is set to false. The selected output peak signal 516 from the peak identifier module 515 is used to produce the SNR metric to the corresponding peak point for the corresponding GNSS frequency band or sub-band. Further, the notch filter control module 410 can set the enable signal 404 to true if any of the SNR metric values exceed an upper threshold of signal strength, signal quality, or SNR, such as the OnTh (585) of the signal 518 as shown by the transition curve 582 (in FIG. 10.). The selected output peak signal 516 will remain in effect until the SNR of this peak is lower than a lower threshold of signal strength, signal quality or SNR, such as the OffTh (584) of the signal 518 as shown by the transition curve 581 (in FIG. 10). For example, the signal quality may be based on SNR, signal strength or bit error rate, dilution of precision, signal fading, signal reception reliability versus time, or other signal quality metrics. The transient tolerant zone 583 in which the notch filter is active or enabled is picked by balancing the response sensitivity and the stability of the notch filter configuration.

FIG. 6 describes notch filter control module 410, whereas FIG. 11A, FIG. 11B, FIG. 12A and FIG. 12B illustrate the performance concern for the situation when the notch filter is not optimally configured.

FIG. 11A is an illustrative graph of the magnitude 615 for various filter coefficients of a notch filter versus time 617 (e.g., number of sampling intervals) in a noise only environment, such an interfering signal. In FIG. 11A, the input signal (116, 136) to the notch filter may comprise only noise and PN sequence. Further, in this example, the tap vector signal 313 of FIG. 6 comprises two complex tap coefficients and is noise-like because the phase of a second noise sample is uncorrelated with that of a first noise sample. Therefore the tap vector signal 313 does not help to reject any interference.

Under a noise-only environment, the performance degrades more with the notch filtering than that without the notch filter processing. In FIG. 11A, the signal 601 is the real part of the first complex tap of the tap vector signal 313; the signal 602 is the imaginary part of the first complex tap of the tap vector signal 313; the signal 603 is the real part of the second complex tap of the tap vector signal 313; the signal 604 is the imaginary part of the second complex tap of the tap vector signal 313. All of the signals (601, 602, 603, 604) are noise-like and converge to zero-mean over a sufficient period of update intervals (e.g., 40,000 updates).

FIG. 11B is an illustrative graph of samples 605 versus frequency 607 for a filter that illustrates group delay or phase distortion versus frequency. The group delay of the notch filter is denoted by signal 611, where the notch filter takes a complex tap value at a corresponding specific epoch. Compared with the ideal constant "0" group delay (signal 612) across the sampling frequency, the group delay signal 611 shows multiple random ripples over the sampling frequency. In particular, if the selective and notch filtering of the disclosure is applied to GLONAAS FDMA GNSS system, the group delay signal 611 can cause random inter-frequency bias for the use of GLONSS FDMA system. Additionally, the noise-like tap vector performs like an electronic device with internal thermal noise and thus making the processing noisier.

FIG. 12A an illustrative graph of the magnitude for various filter coefficients of a notch filter versus time (e.g., number of sampling intervals) that relates to performance degradation of a filter resulting from a mismatch of a notch filter configuration and radio reception conditions or environment. In FIG. 12A, the input signal (116, 136) to the notch filter comprises a strong continuous-wave (CW) interference. To the extent the tap vector signal 313 of FIG. 6 has a dimension of two or two taps to reject two corresponding CW interferences, the configuration with dual rejection of CW interferences can lead to unwanted distortion (e.g., as illustrated in curve 631 of FIG. 12B) for reception of the GNSS signal in the presence of only a single CW interference situation. In FIG. 12A, the signal 621 is the real part of the first complex tap of the tap vector signal 313; the signal 622 is the imaginary part of the first complex tap of the tap vector signal 313; the signal 623 is the real part of the second complex tap of the tap vector signal 313; the signal 624 is the imaginary part of the second complex tap of the tap vector signal 313. The two taps can be configured to converge to different constants that work together to reject a single CW interference to minimize or address the potential distortion that might otherwise occur.

FIG. 12B is an illustrative graph of samples versus frequency for a filter that illustrates group delay or phase distortion versus frequency. The group delay of the notch filter, by taking the complex tap at a specific epoch, is denoted by signal 631. Compared with the ideal group delay 632 which shows a discontinuity at CW frequency 633, the actual group delay signal 631 matches well with ideal group delay 632 at the frequency location 633. However, actual group delay 631 shows the second group delay discontinuity at frequency location 634. The second discontinuity at location 634 results from using the two-tap vector signal 313 to reject a single CW which ideally should be rejected using a single tap signal. In particular, if the selective and notch filtering with two-taps is applied to GLONAAS FDMA (frequency division multiple access) GNSS system, such group delay distortion can introduce annoying inter-frequency bias in the GLONASS FDMA GNSS system.

From the example illustrated by FIG. 11A and FIG. 11B, and the example illustrated by FIG. 12A and FIG. 12B, if the notch filter is not aligned with the observed interference, the notch filter may not offer benefits for high performance GNSS solution. For example, if the notch filter status or the configuration does not match the reception situation, the reception of the GNSS signal or GNSS receiver performance can be degraded. To address the alignment of the observed interference with the notch filter status (e.g., enablement for a time period versus disablement for a time period) and configuration, the notch filter control module 410 perceives the reception condition and optimally configures and controls the notch filter.

A fast resettlement process in the presence of the detectable WBI is set forth in FIG. 13 through FIG. 16, inclusive.

Figure 13:
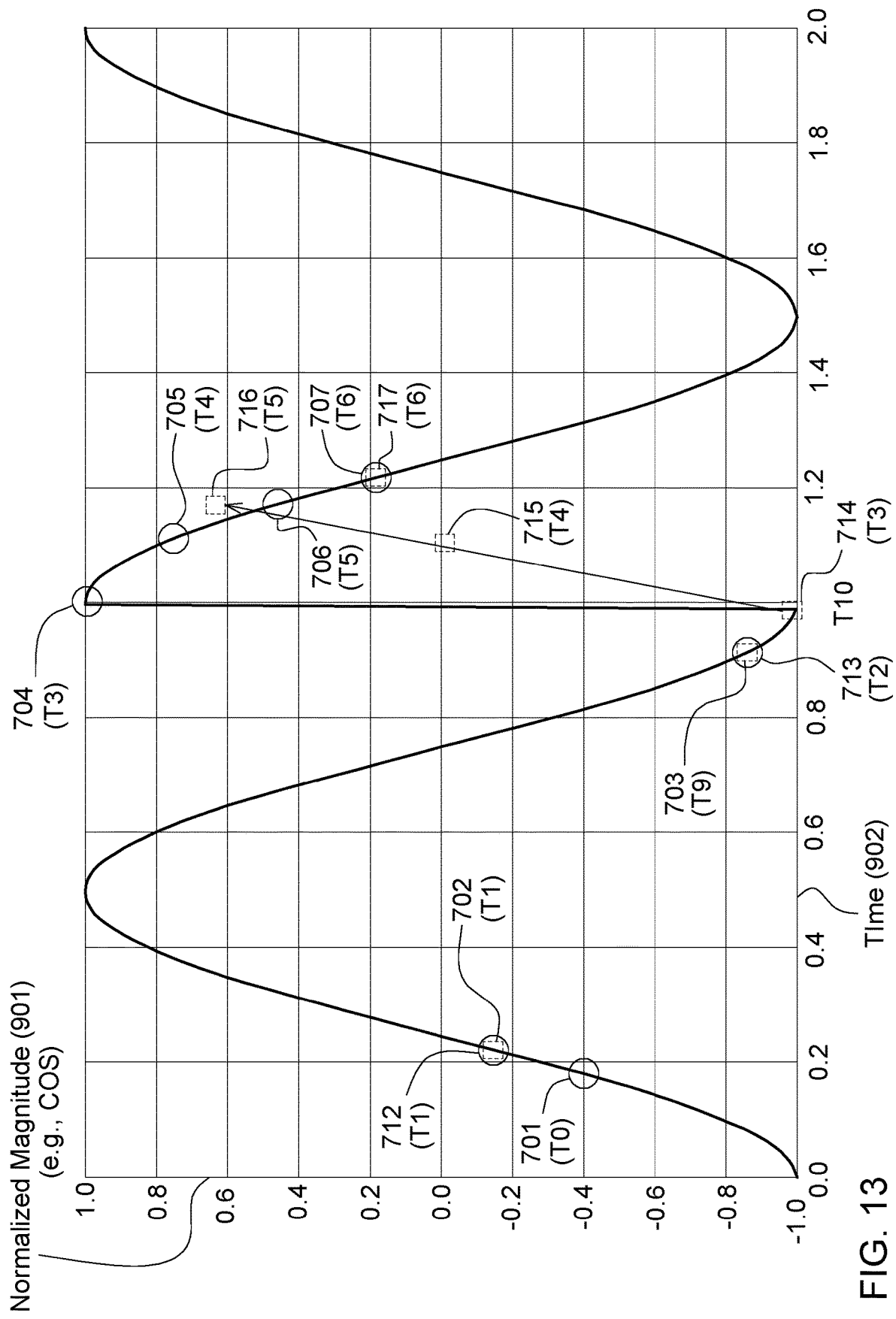
FIG. 13 is an illustrated graph that relates to regular resettlement of notch filter in the presence of a phase jump.

FIG. 13 is an illustrated graph of normalized signal magnitude 901 (e.g., illustrative cosine or sine function) versus time 902 that relates to regular resettlement of notch filter in the presence of a phase jump.

In FIG. 13, the composite signal, such as represented by one or more baseband signal(s) (113, 133), of FIG. 1A, FIG. 5 and/or FIG. 6 may be interfered by the some WBI signal 304, which will negatively impact the performance and stability of the notch filter 306 in FIG. 5, such as line enhancement (LE) module or LE filter. In one embodiment, a line enhancement module comprises an adaptive line enhancement module that has an input of a composite signal that comprises a target signal component and a noise component and that has an output that attenuates, reduces or eliminates the noise component. For example, an adaptive line enhancement module may comprise a device that has first signal path that is not delayed and a second signal path that is coupled to a delay unit that delays a sample by one or more samples (e.g., sampling intervals), where the first signal path and the second signal path are coupled to a summer that sums the first signal of the first signal path with the second signal of the second signal path to produce a difference or error signal. For example, the difference or error signal can be provided to an amplifier to adjust gain, magnitude versus frequency response, and/or filter coefficients (e.g., filter weights) that are applied to generate an output based on the second signal path, such as set forth in U.S. Pat. No. 4,238,746.

As explained previously in this document in conjunction with FIG. 5, the blanking module and NF control module 213 can detect a pulse (e.g., large pulse) and zero (or adjust)

the samples over the pulse period to address or reduce WBI. However, the blanking algorithm also introduces the phase jump, similar to the WBI, which negatively impact the notch filter 306, such as the first NB rejection system 110 and the second NB rejection system 130. By learning a phase step of NBI from epoch k−1 to epoch k, the notch filter (306, 110, 130) is able to predict the NBI waveform at epoch k locally so that the NBI component can be removed from the received composite signal at epoch k. In FIG. 13, the negative impact on the performance of notch filter (306, 110, 130) may arise from a potential phase jump; later figures address a phase compensator to mitigate the impact of the phase jump, which uses the signal 425 and signal 435 (or respective data messages of the signal) of FIG. 6.

FIG. 13 and Table 4 describe the sample signals of a CW sampling at 6 epochs. For example, each period, from epoch k to epoch k+1, may contain a single sample period or multiple of sample periods. The corresponding system state transitions are illustrated in FIG. 14.

Figure 14:
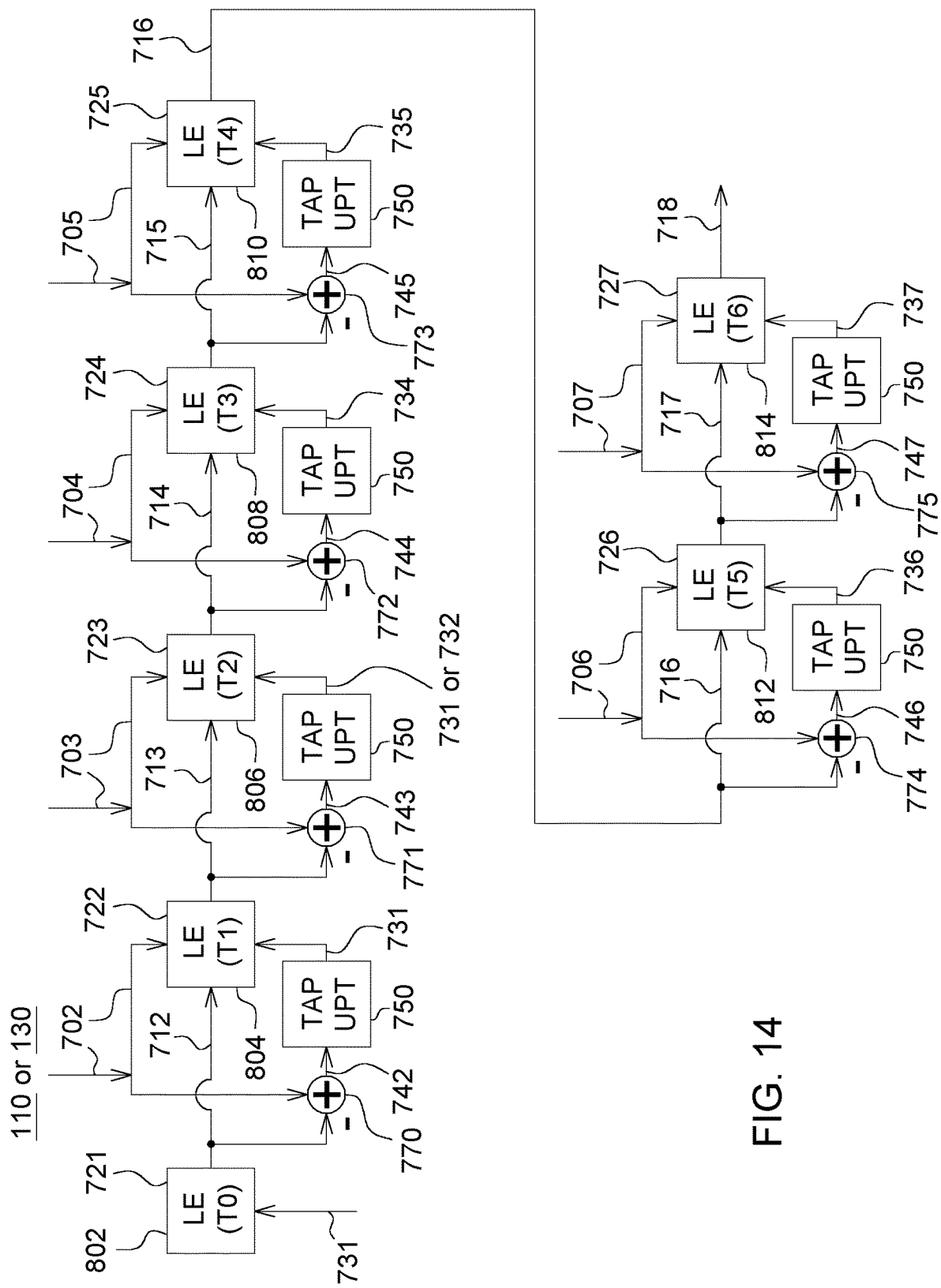
FIG. 14 is a block diagram of a notch filter with delay lines and taps, where the notch filter undergoes a state transition of the notch-filter, regular resettlement in the presence of a phase jump.

FIG. 14 is a block diagram of a notch filter with delay lines (e.g., line enhancement modules), summers and taps (e.g., tap update modules), where the notch filter undergoes a state transition of the notch-filter, regular resettlement in the presence of a phase jump. The tap update modules are configured with filter coefficients that can determine the parameters of the notch, such as notch frequency, maximum notch depth, and notch shape factor of the notch filter. In one embodiment, each line enhancement module comprises a component of the notch filter to estimate the NBI.

If the notch filter (306, 110, 130) already settles in the steady state mode, at epoch T0, the memory (e.g., register, stack or data storage) of the preliminary line enhancement module 802 with corresponding time delay 721 (e.g., of one sampling interval or period, such as a unit delay) has the signal state 731 of input signal vector (e.g., initial input vector) and receives the adaptive tap vector, where at epoch T0 the same signal state 731 of the adaptive tap vector appears both at the input of the preliminary line enhancement module 802 and at the output of the first tap update module 750.

Based on the foregoing states 731 of the input signal vector and adaptive tap vector, the preliminary line enhancement module 802 makes a local prediction of a prediction signal 712 for the NBI sampled (e.g., received input signal sample 702 (e.g., NBI) at respective epoch T1. The first summer 770 determines an error signal by adding the prediction signal 712 to received input signal 702 (e.g., input signal state of sample of received signal with potential NBI at epoch T1) of the first line enhancement module 804 for epoch T1. In an ideal condition, the prediction signal 712 matches the received input signal 702 (e.g., with actual or potential NBI) perfectly, which results in the error signal 742 to be zero at the output of the first summer 770.

If the first summer 770 produces an error signal 742 of zero, then signal 742 drives the tap update module 750 to maintain the previous output tap vector signal 731 of epoch T0 for epoch T1. This process is illustrated in the FIG. 13 and FIG. 14 by showing that the received input signal 702 (e.g., sample for epoch T1 including NBI) overlaps the prediction signal 712 perfectly. This process from epoch T0 to T1, repeats for each next epoch, such as the period from epoch T1 to epoch T2. However, more generally, the second summer 771 sums the prediction signal 713 and the received input signal 703 (e.g., sample at respective epoch T2 with actual or potential NBI) of the second line enhancement module 806 with corresponding time delay 723 to produce the error signal 743. The second tap update module 750 receives the error signal 743 as input and determines the tap vector signal (731 or 732).

At epoch T2, the second line enhancement module 806 with respective time delay 806 combines the memory state 713 with the tap vector signal (731 or 732) to create the predicted NBI signal 714 for epoch T3. However, at epoch T3, the third line enhancement module 808 with respective time delay 724 received input signal 704 (e.g., for corresponding epoch T3 with potential or actual NBI) that, in an illustrative example, includes a phase jump with respect to the received input signal 703 sampled at epoch T2. Therefore, at the output of the third summer 772 the error signal 744 at epoch T3 is significant and changes the tap vector signal to signal state 734, which the third line enhancement module 808 processes with its memory state and respective time delay 724 to obtain the local prediction signal 715 for epoch T4. As illustrated in FIG. 14, the change of the tap vector signal at epoch T3 makes the local prediction signal 715 closer to the received input signal 705 (e.g., received input sample) at corresponding epoch T4.

At epoch T4, because of the error signal 745 at an output of the fourth summer 773, in the illustrative example, the fourth tap update module 750 further adjusts the tap vector signal 735 to reduce the error signal (in the same update direction as the previous or third tap update module 750); the resultant tap vector signal 735 combines with the memory state 725 of the fourth line enhancement module 810 to generate the local prediction signal 716 for corresponding epoch T5.

At epoch T5, because of the potential filter overshooting problem (too big of a step along the same direction) by the fifth tap update module 750, the sign between the local prediction signal 716 and the received signal sample 706 flips (or is opposite) compared with the sign between the local prediction signal 715 and the received signal sample 705 at corresponding epoch T4. Therefore, at the output of the fifth summer 774 the error signal 746 at epoch T5 drives the fifth tap update module 750 to adjust the tap vector signal 736 in opposite direction from prior tap vector signal 735 at epoch T4. During epoch T5, the tap vector 736 and the memory state and line delay 726 of the fifth line enhancement module 812 determines or establishes the new settlement or local prediction state 717, at first data ports 161 and/or second data ports 171, for epoch T6.

Figure 16:
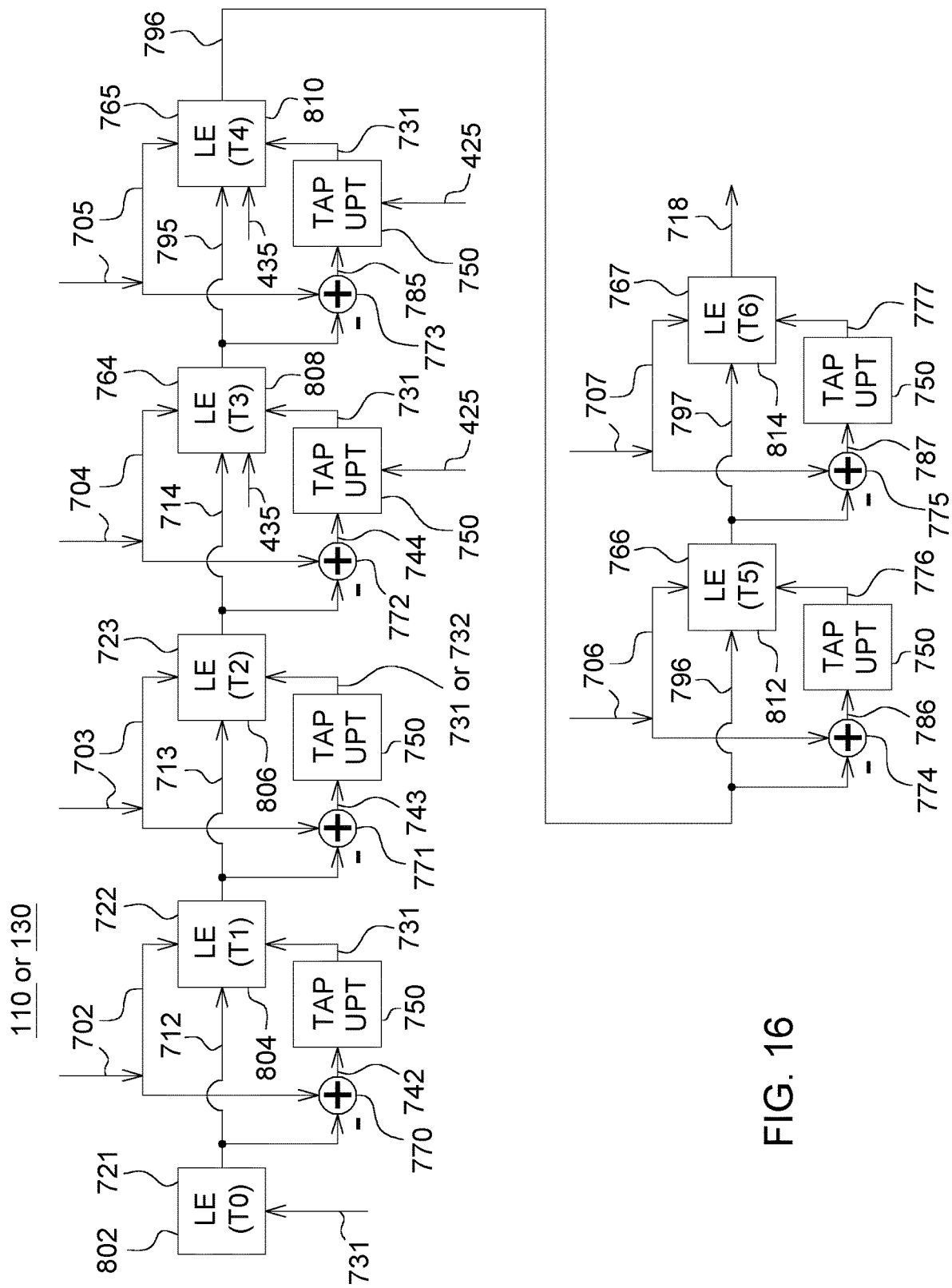
FIG. 16 is a block diagram of a notch filter with delay lines and taps, where the notch filter undergoes a state transition of the notch-filter, rapid resettlement in the presence of phase jump.

In the illustrative example of FIG. 16, after the new steady state is settled, at epoch T6, the local prediction signal 717 matches the received signal sample 707 perfectly again, which can drive the output error signal 747 of the sixth summer 775 to approach or reach zero. Accordingly, the steady state local prediction signal 717 is generally maintained at filter output 718 until the next phase jump occurs (e.g., in one or more received input signals or received input signal samples, which may contain NBI or phase jumps resulting from NBI). Once the next phase jump occurs, the resettlement process described by the foregoing steps of FIG. 14 is repeated.

In this example shown by FIG. 13 and FIG. 14, the phase jump in the received input signal sample 704, which is processed by the third line enhancement module 808 with corresponding time delay 724, at respective epoch T3, unnecessarily causes the error signal 744 to change the tap vector signal 731. In the FIG. 13 at epoch T3 (with received input signal (sample) 704), the notch filter (306, 110, 130) is able to correctly predict the next received input signal (sample) 705 at corresponding epoch T4, where the notch filter (306, 110, 130) and third line enhancement module 808 uses the tap vector signal 734 and the received signal sample 704 at epoch T3. The signal state 713 at epoch T2 and signal state 714 at epoch T3 cannot be used to derive received signal sample 705 at T4, without a phase adjustment. The notch filter or data processor (160, 170) may estimate phase adjustment or compensatory phase shift based on an observed phase difference between received input signal 704 at epoch T3 and received input signal sample 703 at epoch T2. To the extent that phase jump can be detected, such detection information (e.g., compensatory phase shift) can be passed on to the adaptive module 311 to mitigate or counter the negative impact of the resettlement process described in conjunction with FIG. 14.

Figure 15:
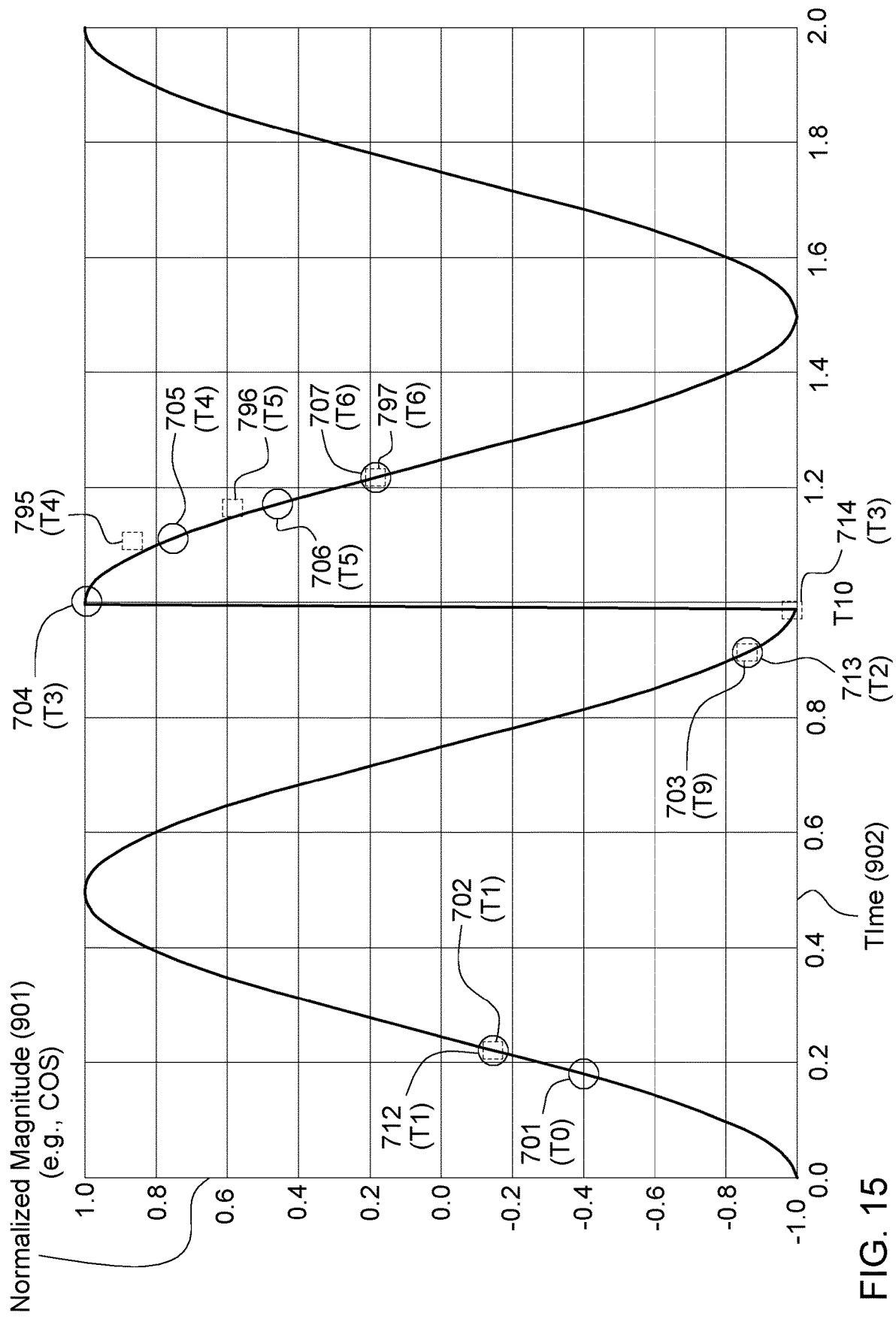
FIG. 15 is an illustrated graph that relates to rapid resettlement of notch filter in the presence of a phase jump, where the rapid resettlement period of the rapid resettlement is less than a regular resettlement period of the regular resettlement of FIG. 13.

FIG. 15 is an illustrated graph of normalized signal magnitude 901 (e.g., illustrative cosine or sine function) versus time 902 that relates to rapid resettlement of notch filter in the presence of a phase jump, where the rapid resettlement period of the rapid resettlement is less than a regular resettlement period of the regular resettlement of FIG. 13. Similarly, FIG. 16 is a block diagram of a notch filter with delay lines and taps, where the notch filter undergoes a state transition of the notch-filter, rapid resettlement in the presence of phase jump.

The innovative control strategy proposed here can speed up the resettlement process, which is illustrated in FIG. 15 and FIG. 16. The phase jump and associated compensatory phase shift can be stored in a data storage device (e.g., as a priori knowledge, or in a look-up table) to the notch filter system. For example, the blanking and notch filter (NF) control module 213 can trigger the reset signal 214; where, in one configuration, the reset signal can represent a detected phase jump signal and a corresponding known compensatory phase shift.

The filter system (e.g., notch filter) of FIG. 16 is similar to the filter system of FIG. 14, where like reference numbers indicate like elements, except in FIG. 16 input terminals for control signals 435 to line enhancement elements (808, 810) are added or shown, and input terminals for control signals 425 are added or shown to certain ones of the tap update modules (750).

As illustrated in FIG. 6, the notch filter control module 410 uses the reset signal 214 to generate a vector signal 402 to optimally configure the notch filter (306, 110, 130). The vector signal 402 includes the enable signal 404 (e.g., ON/OFF signal) and the sub-vector signal 405. The sub-vector signal 405 includes the filter order signal 415, the tap update disable signal 425, and the memory reset signal 435. The control signals 425 and 435 (e.g., from the notch filter control module 410 of FIG. 6) are used to describe the new resettlement process illustrated by FIG. 16.

In FIG. 16, at epoch T3, the reset signal 435 is used to reset the memory of the third line enhancement module 808 (e.g., filter element) in FIG. 16 and set it to state 764 (e.g., compared with state 724 in FIG. 14 for the third line enhancement module 808). For example, the third line enhancement module 808 has corresponding time delay 764 (which can be applied to prediction signal 714). Here, in the illustrative example of FIG. 16, state 764 comprises the new received signal sample 704 and zeros, where the new memory state 764 resets to the new phase implied in the received input signal 704, consistent with the compensatory phase shift (e.g., a priori information) stored in a data storage device (e.g., that is activated for a corresponding blanking operation for WBI reduction). At the same time during corresponding epoch T3, the third tap update module 750 receives disable signal 425 and ignores the significant error signal 744 at epoch T3, making a previous tap output signal 731 from epoch T2 intact at epoch T3. For the illustrative example with the phase jump, compared with the tap vector signal 734 in FIG. 14, tap signal 731 is much better to represent the continuity after the epoch T3. At epoch T3, using the tap vector 731 and new memory state signal 764, the prediction signal 795 is obtained for epoch T4, which is much closer to the received input signal (sample) 705 (e.g., with NBI) at corresponding epoch T4.

At epoch T4, due to the latency in determining that the wide band interference (WBI) has gone away, the notch filter control module 410 (e.g., via control signal 425) will continue to disable the fourth tap update module 750 during the latency period, keeping the tap vector signal 731 intact from the previous epoch T3. At the same time, the memory state of the fourth line enhancer 810 is reset to the new state 765, which are used to generate the prediction signal 796 for respective epoch T5.

At epoch T5, the notch filter control module 410 does not disable the fifth tap update module 812 with corresponding time delay 750 and does not reset the memory of the fifth line enhancement module 812 (e.g., fifth line enhancer). The error signal 786 between the prediction signal 796 and the received input signal (sample 706) for the corresponding epoch T5 only requires slight adjustment by the fifth tap update module 750 to the tap vector signal 731 (of epoch T4) to result in tap vector signal 776 for epoch T5. At epoch T5, the new strategy promptly completes the resettlement process; significantly reduces the possible large error and potential overshooting problem that might be experienced otherwise by a single phase jump introduced in the received input signal (sample) at respective epoch T3 in the illustrative example. At epoch T5, the fifth line enhancement module 812 provides the prediction signal 797 that results from the memory state 766 and the tap vector signal 776. The prediction signal closely matches the received signal sample 707 at epoch T6.

Table 4 provides received signal samples, signal states and prediction signals for corresponding epochs with respect to one embodiment of the settlement and compensatory phase configuration illustrated in FIG. 13 and FIG. 14. Table 5 provides received signal samples, signal states and prediction signals for corresponding epochs with respect to another embodiment (e.g., an alternate embodiment) of the settlement and compensatory phase configurations illustrated in FIG. 15 and FIG. 16.

TABLE 4

Signals List for FIG. 13 and FIG. 14

| Epoch | IN SIGNAL | LE DLY (NO RST) | ERR SIGNAL (NO RST) | LE Prediction (NO RST) | LE TAPS (NO RST) |
|---|---|---|---|---|---|
| T0 | | 721 | | | 731 |
| T1 | 702 | 722 | 742 | 712 | 731 |
| T2 | 703 | 723 | 743 | 713 | 731 |
| T3 | 704 | 724 | 744 | 714 | 734 |
| T4 | 705 | 725 | 745 | 715 | 735 |
| T5 | 706 | 726 | 746 | 716 | 736 |
| T6 | 707 | 727 | 747 | 717 | 737 |

TABLE 5

Signals List for FIG. 15 and FIG. 16

| Epoch | IN SIGNAL | LE DLY (RST) | ERR SIGNAL (RST) | LE Prediction (RST) | LE TAPS (RST) |
|---|---|---|---|---|---|
| T0 |     |     |     |     | 731 |
| T1 | 702 | 722 | 742 | 712 | 731 |
| T2 | 703 | 723 | 743 | 713 | 731 |
| T3 | 704 | 764 | 744 | 714 | 731 |
| T4 | 705 | 765 | 785 | 795 | 731 |
| T5 | 706 | 766 | 786 | 796 | 776 |
| T6 | 707 | 767 | 787 | 797 | 777 |

Although certain embodiments of receivers, systems, methods, processes and examples have been described in this disclosure, the scope of the coverage of this disclosure may extend to variants of the receiver, systems, methods, processes and examples and systems and concepts disclosed herein. For example, in any patent that may be granted on this disclosure, one or more claims can cover equivalents and variants to the full extent permitted under applicable law, among other things The following is claimed:

1. A receiver system with interference rejection, the receiver system comprising:
    an antenna for receiving a radio frequency signal;
    a downconverter for converting the radio frequency signal to an intermediate frequency signal;
    an analog-to-digital converter (ADC) for converting the intermediate frequency signal or an analog baseband signal to a digital baseband signal;
    a selective filtering module for filtering of the digital baseband signal consistent with a target receive bandwidth comprising a narrowband rejection filter and a wide band rejection filter;
    the narrowband rejection filter configured to reject a first interference component, narrowband rejection filter comprising an adaptive notch filter (NF) supporting an infinite impulse response mode;
    the wide band rejection filter configured to reject a second interference component in accordance with a pulse blanking technique;
    an electronic data processor for controlling one or more filter coefficients of narrowband rejection filter and the wide band rejection filter in accordance with one or more strategic filter control factors among ADC saturation, activation/deactivation of the notch filter, and a wide-band spectrum analysis.

2. The receiver system according to claim 1 further comprising:
    an automatic gain control (AGC) module configured to minimize any discontinuity of the waveform of the narrowband interference (NBI) resulting from saturation of the ADC by the intermediate frequency signal inputted to the ADC; and
    in conjunction with AGC module attenuating the magnitude of the intermediate frequency signal inputted to the ADC, the wide band rejection filter simultaneously configured to reject a pulse-like, wide band interference (WBI) by applying the pulse blanking technique.

3. The receiver system according to claim 1 further comprising:
    a stability module for minimizing the negative impact on notch filter (NF) stability resulting from the ADC saturation.

4. The receiver system according to claim 1 wherein the saturation of the ADC comprises ADC clipping that introduces the waveform discontinuity of the NBI that can impact performance of the NF, and further comprising:
    a predictive filter provides a local estimate of the NBI waveform based on the waveform discontinuity of the NBI to adjust adaptively one or more filter coefficients of the NF based on the local estimate of the NBI waveform.

5. The receiver system according to claim 1 wherein activation or turning on of NF impacts at least one of pseudo-range measurements and carrier phase measurements with measurement distortion; and further comprising:
    a distortion compensator to adjust adaptively one or more filter coefficients of the NF to reduce or minimize the measurement distortion when the NF is activated or turned on.

6. The receiver system according to claim 5 wherein the distortion compensator is configured to apply hysteresis to avoid the measurement distortion resulting from the frequently switching on and off the NF.

7. The receiver system according to claim 1 further comprising:
    a wide-band spectrum analyzer based on a fixed point fast Fourier transform (FFT) from which a magnitude versus frequency spectrum for each global navigation satellite system (GNSS) band can be derived, the magnitude versus frequency spectrum for each band compensated based on the GNSS selective filter response of a corresponding selective filtering module.

8. The receiver system according to claim 7 wherein the wide-band spectrum analyzer is adapted to apply a large scale linear to logarithmic (decibel) converter that uses a Taylor expansion and a manageable lookup table (LUT).

9. The receiver system according to claim 1 wherein the wide-band spectrum analyzer is adapted to extract a predominate pattern or peak pattern from the magnitude versus frequency spectrum for each GNSS band; and
    the electronic data processor configured to adaptively and optimally configure the NF to the sensed radio environment.

* * * * *